United States Patent
Yokota et al.

(10) Patent No.: US 7,702,458 B2
(45) Date of Patent: Apr. 20, 2010

(54) METHOD AND APPARATUS FOR ENTERING STREET NAME

(75) Inventors: Tatsuo Yokota, Torrance, CA (US); Alex Panganiban, Torrance, CA (US); Joey Pascual, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 642 days.

(21) Appl. No.: 11/728,824

(22) Filed: Mar. 27, 2007

(65) Prior Publication Data
US 2008/0243376 A1    Oct. 2, 2008

(51) Int. Cl.
*G01C 21/30* (2006.01)
*G06F 17/00* (2006.01)

(52) U.S. Cl. .................. 701/209; 701/211; 340/995.21; 707/3; 707/6

(58) Field of Classification Search .................. 701/209, 701/211, 200, 35; 340/995.16, 995.17, 995.23, 340/995.14; 707/3, 6
See application file for complete search history.

(56) References Cited

U.S. PATENT DOCUMENTS

| | | | | |
|---|---|---|---|---|
| 5,819,200 A | * | 10/1998 | Tamai et al. | 701/208 |
| 6,112,153 A | * | 8/2000 | Schaaf et al. | 701/200 |
| 6,487,495 B1 | * | 11/2002 | Gale et al. | 701/209 |

\* cited by examiner

*Primary Examiner*—Tan Q Nguyen
(74) *Attorney, Agent, or Firm*—Muramatsu & Associates

(57) ABSTRACT

A method and apparatus for a navigation system for inputting a street name allows a user to quickly find a desired street name even when the user inputs an incorrect prefix or suffix of the street name. The navigation system accepts a street name based on either a base name input method or a full name input method in the same input field while performing a street name search mostly based on a base name of the street name. The method and apparatus hints an inexperienced user the distinction between the base name and other components of the street name so that the user knows that non-base name element is unnecessary for finding the correct address of the destination.

20 Claims, 27 Drawing Sheets

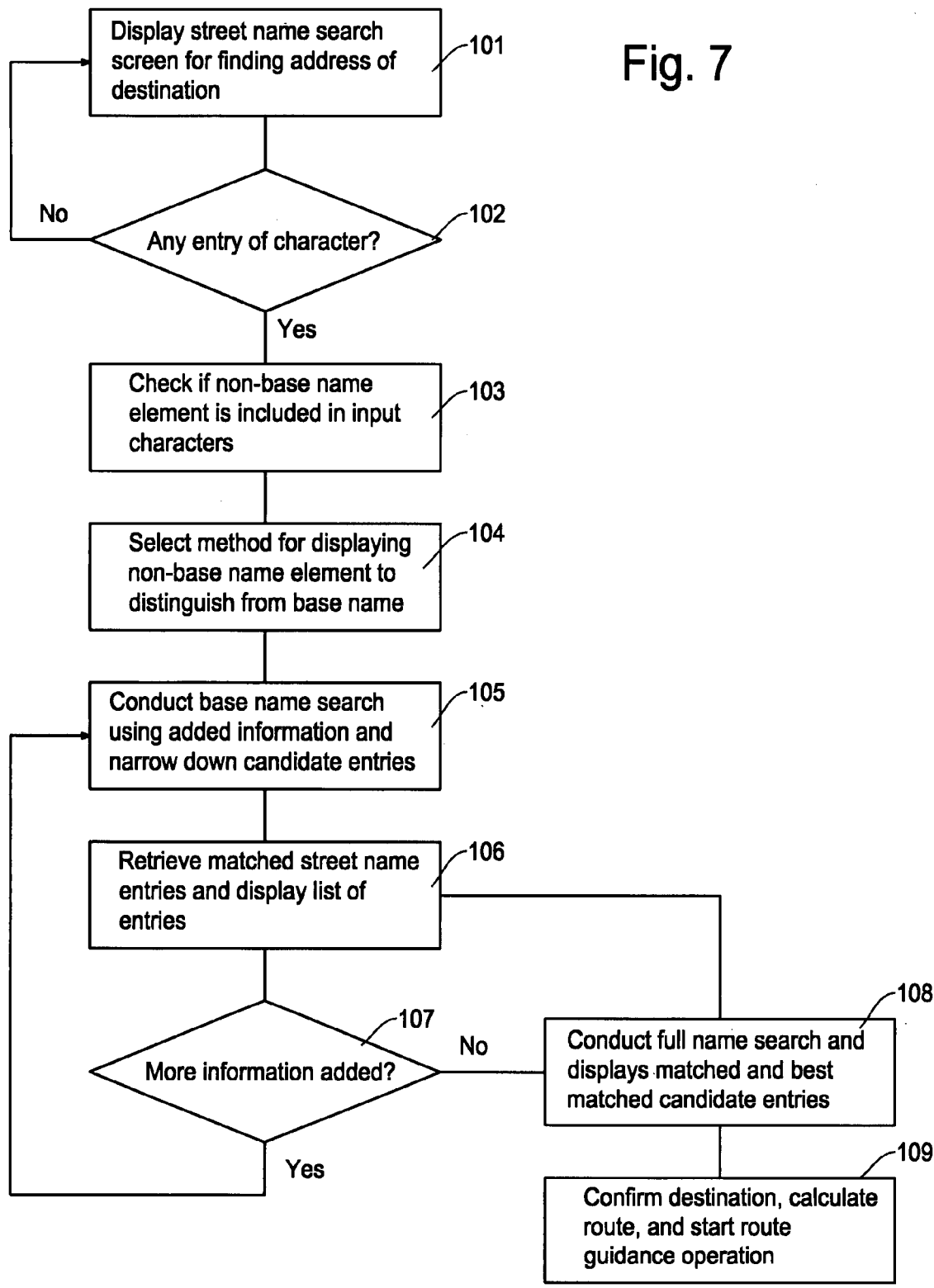

| ******** |
|---|
| MACARTHUR |
| MACDONALD |
| MACKENZIE |
| MACY |
| MADAGASCAR |
| MAGNOLIA |
| MAHOGANY |
| MAIN |
| MAINE |
| MAINSTREAM |
| ******** |

| ******** |
|---|
| N MAGNOLIA ST |
| S MAGNOLIA ST |
| MAHOGANY PL |
| E MAIN AVE |
| MAIN ST |
| N MAIN ST |
| N MAIN AVE |
| MAINE WY |
| MAINE DIVIDED RD |
| MAINSTREAM DR |
| ******** |

METHOD AND APPARATUS FOR ENTERING STREET NAME

FIELD OF THE INVENTION

This invention relates generally to a method and apparatus for entering an address for a navigation system, and more particularly, to a method and apparatus for entering an address of a destination for a navigation system in such a way that it accepts either a base name or a full name of a street name in the same input field to search matching street names.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Typically, the navigation system displays a map image while superimposing thereon a mark representing the current location and notifies the user which direction to turn at an intersection to reach the destination.

FIGS. 1A-1H show an example of overall procedure and screen display involved in the navigation system for route guidance to a destination. FIG. 1A is an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

FIGS. 1B-1F show an example of process for specifying a destination in the navigation system. When selecting a "Destination" menu on a main menu screen of FIG. 1B, the navigation system displays an "Find Destination By" screen as shown in FIG. 1C for specifying an input method for selecting the destination. The "Find Destination By" screen lists various methods for selecting the destination. This example includes the methods of "Address", "Intersection", "Point of Interest", "Recent Route", "Address Book", and "Today's Plan" which are well known in the art.

When selecting, for example, the "Address" method in FIG. 1C, the navigation system displays a keyboard screen in FIG. 1D. Suppose the user inputs an address "2525 W. Carson" of a shopping mall, the navigation system displays a "Confirm Destination" screen such as shown in FIG. 1E. If the name and address on the screen shows the correct destination, the user enters an "OK to Proceed" key to proceed to the next procedure.

In FIG. 1F, the navigation system calculates and determines a route to the destination, i.e., the address "2525 W. Carson". The navigation system determines a route to the destination based on, for example, the quickest way to reach the destination, the route using many free ways as possible or the route without using toll road, and the like. In this example, the navigation system displays a progress scale of the calculation of the route.

Once the route to the destination is determined, the navigation system starts the route guidance as shown in FIG. 1G for guiding the user to the destination. Typically, the navigation system shows the intersection which is highlighted to show the next turn and a direction of the turn. Such route guidance by the navigation system is also accompanied by voice instructions.

The navigation system measures a distance to the current destination to detect whether the destination is within a predetermined range such as within 100 meters. When the user approaches the destination within such a predetermined distance, the navigation system indicates that the destination "Dest" is ahead as shown in FIG. 1H. The navigation system detects the actual arrival based on various factors such as the engine stop.

As noted above, a process of entering a street name (address) is frequently needed when setting a destination in the navigation system. FIGS. 2A-2D are display examples of input screens that accept the user's input of a street name through a full name method. As shown, through a key board screen of FIG. 2A, the user has entered "N MAIN" in the street name field. As a result, the navigation system lists the matching entries that match the user's input "N MAIN" as shown in FIG. 2B. The list shows matching entries "N MAIN", "N MAINE", "N MAINLAND", "N MAINWARD" all of which include "N MAIN". Since the user has input the prefix "N", all of the entries start with a letter "N".

Suppose the user really wants to find an address "10605 E MAIN AVE" in the city of "PALM SPRINGS" but has selected the entry "N MAIN" in FIG. 2B because it was not certain whether it starts "N" or "E". Then, the user enters a house number "10605" for the street name "N MAIN" as shown in FIG. 2C. As a result, two matching entries located in "GARDEN GLOVE" and "SANTA ANA". However, since the prefix "N" is incorrect, the address "10605 E MAIN AVE" in "PALM SPRINGS" intended by the user has not come out by this search.

Although the full name search is direct and intuitive for an inexperienced user, it requires an accurate input of a prefix, suffix and base name. There is another method for inputting a street name in which a user can input a base name of the street without including a prefix or a suffix of the street name. The base name input method is convenient since the user can only remember the base name accurately. However, because it is not direct and intuitive, inexperienced users sometimes do not know such an input method. Therefore, there is a need of a more flexible way of searching a street name for a navigation system which allows both the full name input method and base name input method in the same input field on the screen.

SUMMARY OF THE INVENTION

It is, therefore, an object of the present invention to provide a method and apparatus for a navigation system for easily entering and searching a street name to determine an address of the destination.

One aspect of the present invention is a method for entering a street name to determine an address of the destination for a navigation system. The method includes the steps of displaying a screen for searching a street name, the screen including a street name input field for accepting a user's input of characters either by a full name or a base name of a street, distinguishing a non-base name element from a base name of a street name in the input character and displaying the non-base name element by a selected method on the screen, comparing the base name detected from the characters input by the user with entries in a base name database that stores base names of streets, retrieving base names from the base name database that match the base name detected from the characters input by the user and displaying a list of the retrieved base names, repeating the above steps of comparing and retrieving the base names every time when additional information is supplied by the user, and retrieving full names of streets from a full name database that stores full names of streets to determine a correct address of the destination.

In one example, the step of displaying the non-base name element in the input characters by a selected method includes a step of changing a color or brightness of the non-base name element from that of the base name. In another example, the step of displaying the non-base name element in the input characters by a selected method includes a step of changing a size or a shape of the non-base name element from that of the base name or adding a crossing-out bar on the non-base name element.

In a further example, the step of displaying the non-base name element in the input characters by a selected method includes a step of removing the non-base name element from the screen of the navigation system. In a further example, the step of displaying the non-base name element in the input characters by a selected method includes a step of displaying the non-base name element without change.

Preferably, the step of retrieving the base names from the base name database includes a step of retrieving a base name that exactly matches the base name detected from the characters input by the user as well as a base name that best matches the base name detected from the characters input by the user. Preferably, the step of retrieving the full names from the full name database includes a step of retrieving a full name that exactly matches the characters input by the user as well as a full name that best matches the characters input by the user.

Another aspect of the present invention is an apparatus for entering a street name either by a full name or a base name in the same input field of a monitor screen while conducting the street name search mostly through a base name search, thereby facilitating a procedure for determining an address of the destination. The street name input apparatus is configured to implement the steps defined in the method noted above.

According to the present invention for inputting a street name, the navigation system allows a user to quickly find a desired street name even when the user inputs an incorrect prefix or suffix of the street name. The navigation system accepts a street name based on either a base name input method or a full name input method in the same input field while performing a street name search mostly based on a base name of the street name. The method and apparatus hints an inexperienced user the distinction between the base name and other components of the street name so that the user knows that non-base name element is unnecessary for finding the correct address of the destination.

Since the navigation system extends the search for a street name by looking up all names that match the base name regardless of the other components of the street name, such as a prefix, thereby increasing the possibility of finding matching entries form the street name database. Through the experiences of using the apparatus of the present invention, the user will learn that it is easy and quick to input only a base name without entering a prefix or other components. In the last stage of selecting the street name, the navigation system retrieves one or more full names of the relevant entries and displays a list of the full names so that the user can select the intended address of the destination.

BRIEF DESCRIPTION OF THE DRAWINGS

FIGS. 4A-4B show the process of selecting the base name, FIGS. 4C-4E show the process of inputting the house number, FIGS. 4F-4G show an example of process for selecting the destination, FIGS. 4H-4I show another example of process for selecting the destination, and FIGS. 4K-4K show a further example of process for selecting the destination.

FIGS. 5A-5B show the process of selecting the base name, FIGS. 5C-5E show the process of inputting the house number, FIGS. 5F-5G show an example of process for selecting the destination, FIGS. 5H-5I show another example of process for selecting the destination, and FIGS. 5J-5K show a further example of process for selecting the destination.

FIGS. 6A-6B show the process of selecting the base name, FIGS. 6C-6E show the process of inputting the house number, FIGS. 6F-6G show an example of process for selecting the destination, FIGS. 6H-6I show another example of process for selecting the destination, and FIGS. 6J-6K show a further example of process for selecting the destination.

FIG. 7 is a flow chart showing the basic steps of accepting a street name from the user to search a matching street name based on the base name and indicate the distinction between the base name and the non-base name of the street name and retrieving the correct address of the destination.

FIGS. 9A and 9B are schematic diagrams showing an example of full name database for storing full names of the streets and a base name database for storing base names of the street for a street name based on either the base name input method or full name input method.

DETAILED DESCRIPTION OF THE PREFERRED EMBODIMENT

Figure 1A:
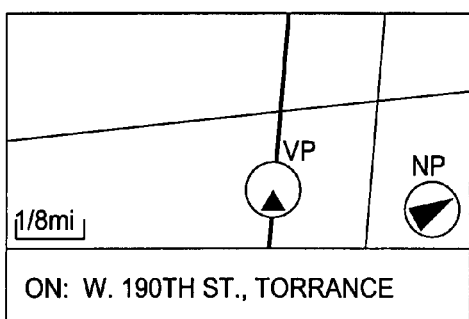
FIGS. 1A-1H are schematic diagrams showing an example of operational process and screen display involved in the navigation system for selecting a destination.
Figure 1B:
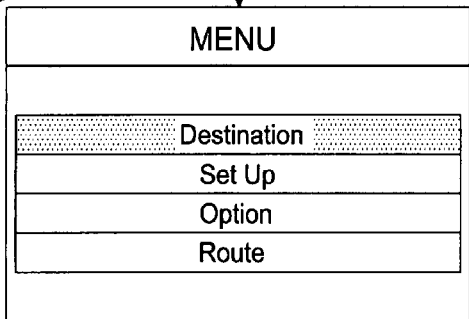

The present invention will be described in detail with reference to the accompanying drawings. The method and apparatus can be advantageously applied to a navigation system for entering a street name although the present invention is not limited to the application to the navigation system. The navigation system implementing the present invention is designed to enable a user to quickly find a desired street name even when the user inputs an incorrect prefix or suffix of the street name. In the present invention, the navigation system has the advantage of accepting a street name based on either a base name input method or a full name input method in the same input field while performing a street name search mostly based on a base name of the street name.

The method and apparatus under the present invention has the display mechanism that hints an inexperienced user the distinction between the base name and other components of the street name. The navigation system extends the search for a street name by looking up all names that match the base name regardless of the other components of the street name, such as a prefix, thereby increasing the possibility of finding matching entries form the street name database. Through the experiences of using the apparatus of the present invention, the user will learn that it is easy and quick to input only a base name without entering a prefix or other components. In the last stage of selecting the street name, the navigation system retrieves one or more full names of the relevant entries and displays a list of the full names so that the user can select the intended address of the destination.

In a search method for finding a street name based on a base name, a navigation system accepts the base name of the street to find the full name of the intended street name. Typically, a full name of a street is comprised of a prefix, a base name, a road type and a suffix. The prefix generally contains a directional indicator such as "N" for North, "S" for South, "NW" for North West, etc. The base name is a name element that is always required as an identifier of the street name. The examples of the road type includes "ST" for street, "AVE" for Avenue, etc. The suffix is typically a direction indication like the prefix but comes after the base name. Thus, a street name "CUMBERLAND" does not a have prefix, road type or suffix, while a street name "N MAIN AVE SE" has all of the name elements. In the base name input method, while the base name is essential, other name elements are optional.

The base name search has the advantage of allowing flexible search capability since the user does not have to enter non-base name elements such as "N" or "ST". Even when the user does not remember whether the street name has a particular prefix or suffix, the navigation system can search a matching entry based on the base name of the street name. Moreover, the time and effort expended to enter the non-base name element can be eliminated since only the base name need to be specified. However, in many occasions, inexperienced users do not realize that he/she can input only a base name of the street.

The navigation system of the present invention allows the user to enter either a full name or a base name of an intended street name in the same input field on the monitor screen. When the user tries to enter a full name of the street name, in the order of a prefix, a base name, road type, for example, the navigation system extracts the base name and searches candidate street names having the extracted base name. When further information such as a house number and a city name is specified or selected by the user, the navigation system lists the full name of the candidate street names that exactly match or best match the information specified so far.

Figure 3A:
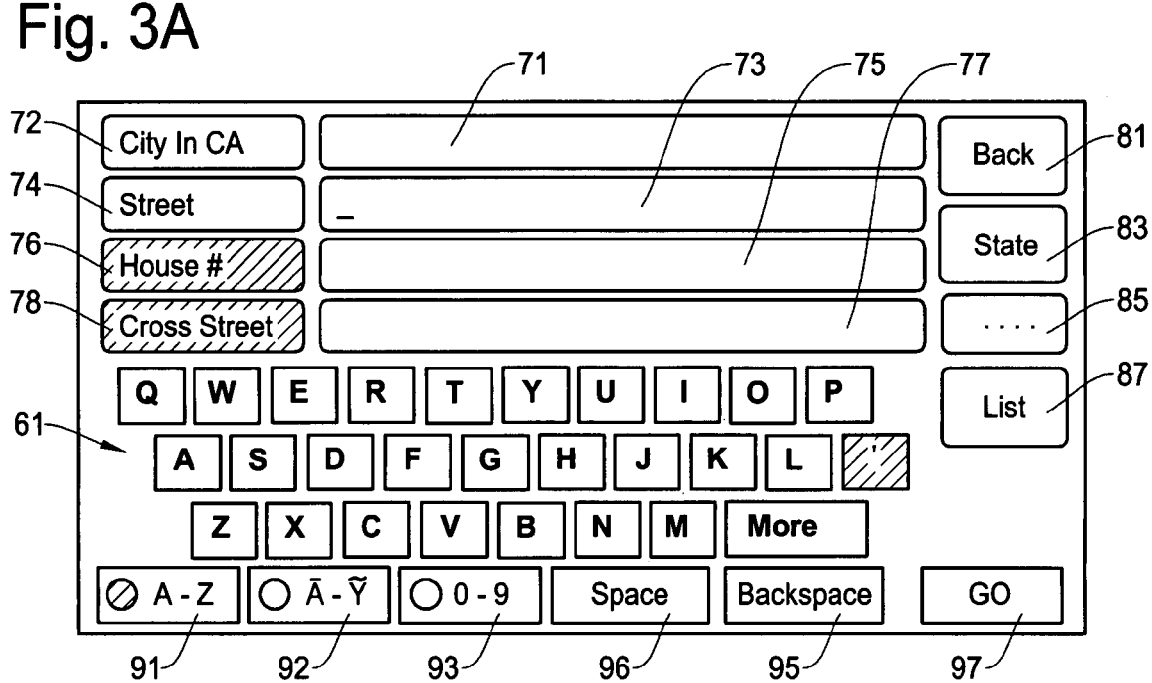
FIGS. 3A-3C are display examples in an embodiment of the present invention showing a first part of the process for searching a street name where a street name input filed is selected in FIG. 3A, a user inputs characters in the street name input field in FIG. 3B, and the user has input a street name with a prefix as "N MAIN" in FIG. 3C.
Figure 3B:
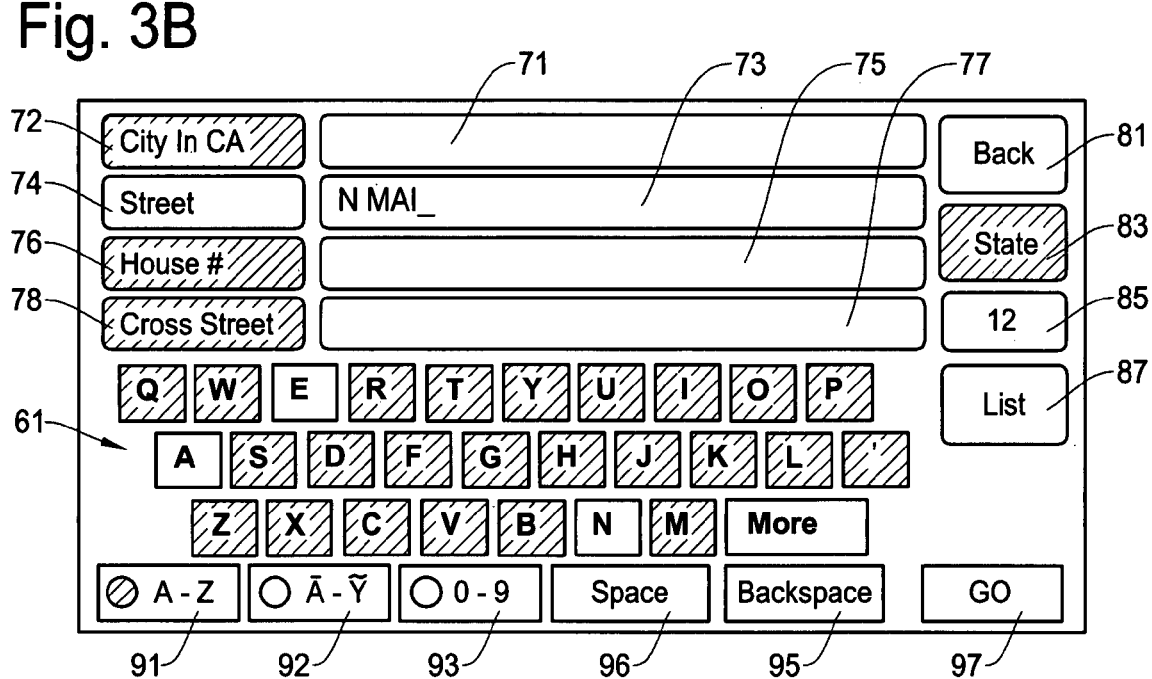
Figure 3C:
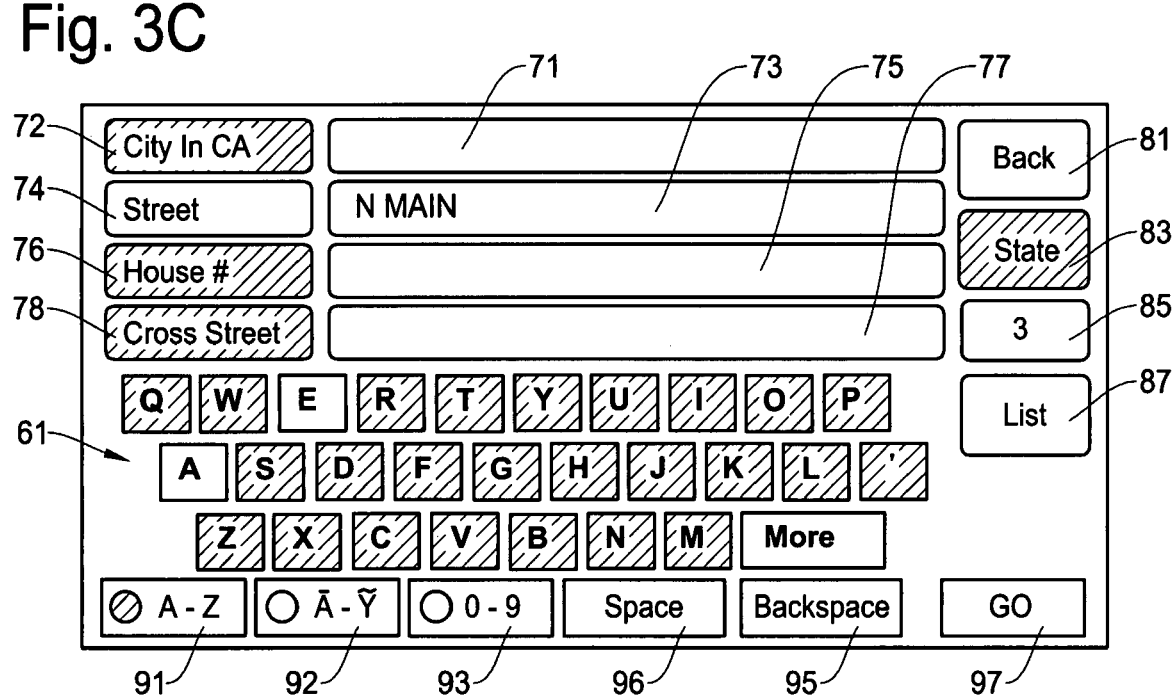

The process and display examples involved in the present invention for entering a street name in the navigation system are described with reference to FIGS. 3A-3C and FIGS. 4A-4K. FIGS. 3A-3C are display examples in an embodiment of the present invention showing a first part of the process for searching a street name. FIGS. 4A-4K are display examples in the embodiment of the present invention showing the remaining part of the process after the process of FIGS. 3A-3C for determining a correct address of the destination.

Figure 1C:
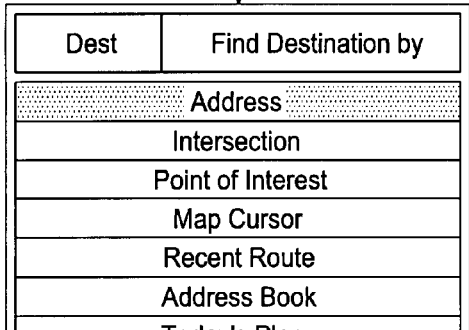
Figure 1D:
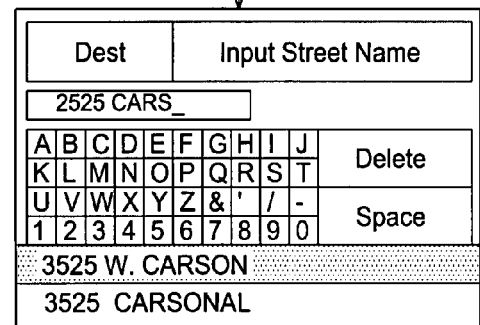
Figure 1E:
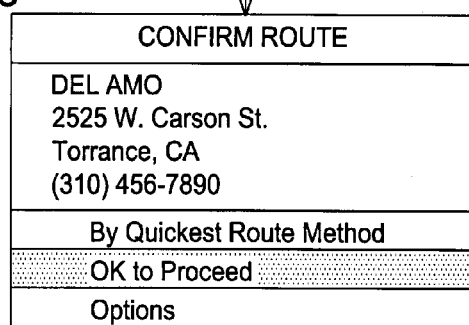
Figure 1F:
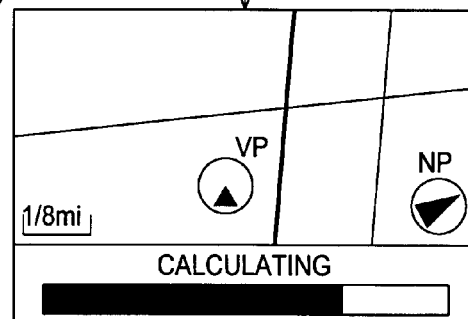
Figure 1G:
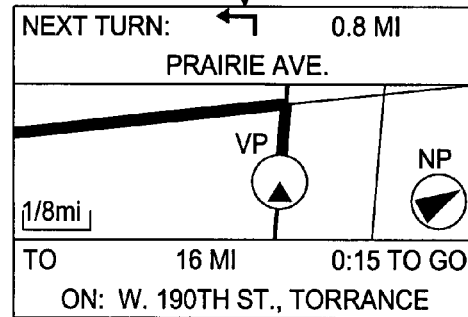
Figure 1H:
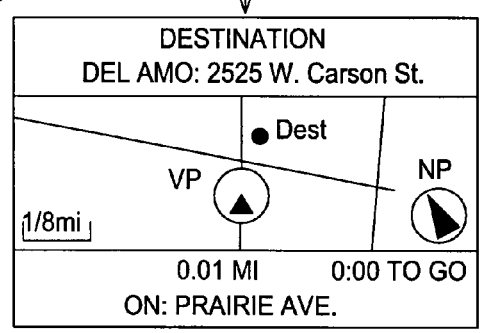

When the user selects the "Address" input method in the process of FIG. 1C, the navigation system displays the street name input screen of FIGS. 3A-3C. FIG. 3A shows a situation where a street name input field is selected, FIG. 3B shows a situation where a user inputs characters in the street name input field, and the user has input "N MAIN" in FIG. 3C. As shown in FIGS. 3B and 3C, the user is trying to input the full name of the intended street that starts with a prefix "N".

The monitor screen in FIGS. 3A-3C includes an alphabetic keyboard 61, a city key 72, a city name input field 71, a street key 74, a street name input field 73, a house number key 76, a house number input field 75, a cross street key 78, and a cross street name input field 77. The alphabetic keyboard 61 is used to input alphabetic characters in the corresponding input filed of the navigation system. The city key 72 is used to selects a city name as a search area. Specifically, by pressing the city key 78, the user can enter the name of a city in the city name input field 71.

The street key 74 is used to select the street name input field 73 for inputting a street name which is essential to the present invention. As noted above, the user can input either a full name or a base name of the intended street name in the street name input field 73. The house number key 76 is used to select the house number input field 75 so that the user can input a house number, and the cross street key 78 is used to specify a cross street name in the cross street name input field 77.

The display further includes a back key 81, a state key, a matching entry indicator 85, and a list key 87. The back key 81 is used to return to the previous screen. The state key 83 allows the user to change the home base location of the state, for example, from Texas to California, etc. The matching entry indicator 85 lists the number of matching entries. Since no input has been provided to the navigation system in FIG. 3A, the matching entry indicator 85 does not indicate any matching entry number. The list key 87 is used to display a list of matching entries.

Moreover, the display in FIGS. 3A-3C also includes an alphabetic keyboard selection key 91, a special character keyboard selection key 92, a numeric keyboard selection key 93, a backspace key 95, space key 96, and a "Go" key 97. The alphabetic keyboard selection key 91 is used to change the keyboard from numeric to alphabetic. The special character keyboard selection key 92 is used to input a special character such as Greek or German characters. The numeric keyboard selection key 93 is used to change the keyboard from alphabetic one to numeric one. Since the alphabet keyboard is displayed, the alphabet keyboard selection key 91 is highlighted. The backspace key 95 moves a cursor in a field to move backward (to the left) and eliminates the character. The space key 96 is use to input a space between the characters. The "Go" key 97 is used to proceed to the next step of operation.

In the display screen shown in FIG. 3A, none of the information is specified while the street name input field is ready to receive characters. FIG. 3B is a display example similar to that of FIG. 3A although characters "N MAI" are entered into the street name input field 73. The navigation system will disable some keys of the keyboards and indicate disabled keys by graying them while keeping enabled keys in a normal color. This helps the user to enter the next character because possible characters that can follow the characters in the input field 73 is limited and thus some keys can be eliminated from consideration.

As will be described later, during the process of determining an address of the destination, a full name database and a base name database will be used to determine what possible characters can follow the character strings that have been input so far. As noted above, the street name input field 73 accepts entries from the user in either a full name including prefix and suffix, or only a base name. In either case, the navigation system utilizes a base name to compare and search candidate street names through the base name database while retrieves a full name of the candidate street through the full name database in the last stage of the process for determining the address of the destination.

In FIG. 3B, the matching entry indicator 85 now shows "12" to indicate the number of matching street name entries as a result of comparing the base name with the entries in the base name database. The navigation system can automatically list matching entries when the entries are narrowed down to a certain number, but the list key 87 can override the normal operation to list matching entries even when matching entries are not limited to a certain number. As the user further enters characters and thus the number of matching entries changes, the matching entry indicator 85 reflects the change by showing the updated number.

FIG. 3C shows the situation where the user has input the characters "N MAIN" and the matching entry indicator 85 now shows "3" to indicate the number of matching street name entries. Since the navigation system performs the base name search rather than the full name search, the navigation system searches the matching entries using only the base name "MAIN". In other words, the prefix "N" is not used during the process for finding the candidate street names in the present invention.

FIGS. 4A-4K are display examples of the present invention showing an example of the remaining part of the process after the process of FIGS. 3A-3C for searching the street name. In this example, the prefix of the street name is changed in color or dimmed to distinguish the base name from the prefix. Other method such as crossing the prefix (ex, "N MAIN") or changing the size or shape of the prefix, are also be possible. Moreover, the prefix (non-base name element) may also be distinguished from the base name by using different font or italic, or by underlining the non-base name element.

In other words, in this example, the prefix is still displayed on the screen but is differentiated from the base name so that the navigation system tells the user that the prefix is unnecessary for the street name search. Thus, in FIG. 4A, the prefix "N" is displayed with a color different from that of the base name "MAIN" in the street name input field 73. For example, the prefix "N" may be blue while the rest of the characters are black. The non-base name elements can also be shown in other colors as well, such as yellow, red, etc.

As noted above, the change of the non-base name element from the rest of the characters (base name element) allows the user to recognize that some distinction exists between the non-base name and the base name. The user is likely to realize that since a character "N" in a street name generally means North, the change of the non-base name indicates to the user that there is a difference for some characters that function like an adjective and not very fundamental to the name of the street. Thus, the user who initially did not know of the function that allows the user to enter base name will realize that the navigation system can distinguish between the base name element and non-base name element and user only the base name.

Figure 4A:
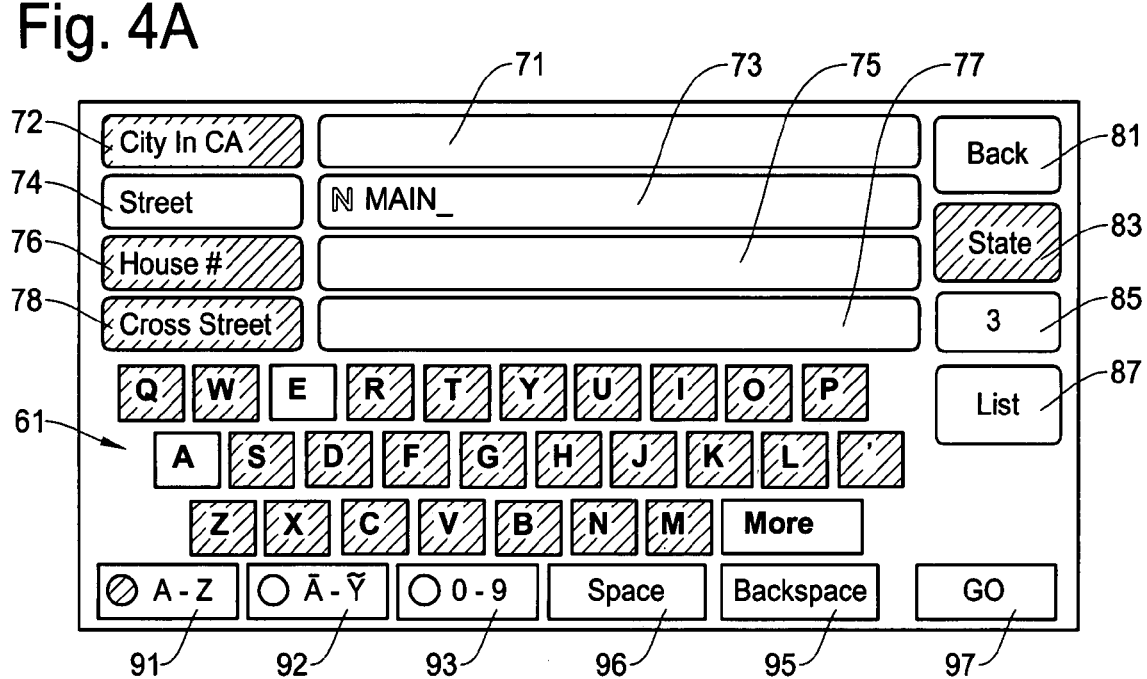
FIGS. 4A-4K are display examples in the embodiment of the present invention showing an example of the remaining part of the process after the process of FIGS. 3A-3C for searching the street name where the prefix of the street name is changed in color or other manner to distinguish the base name element from other elements where
Figure 4B:
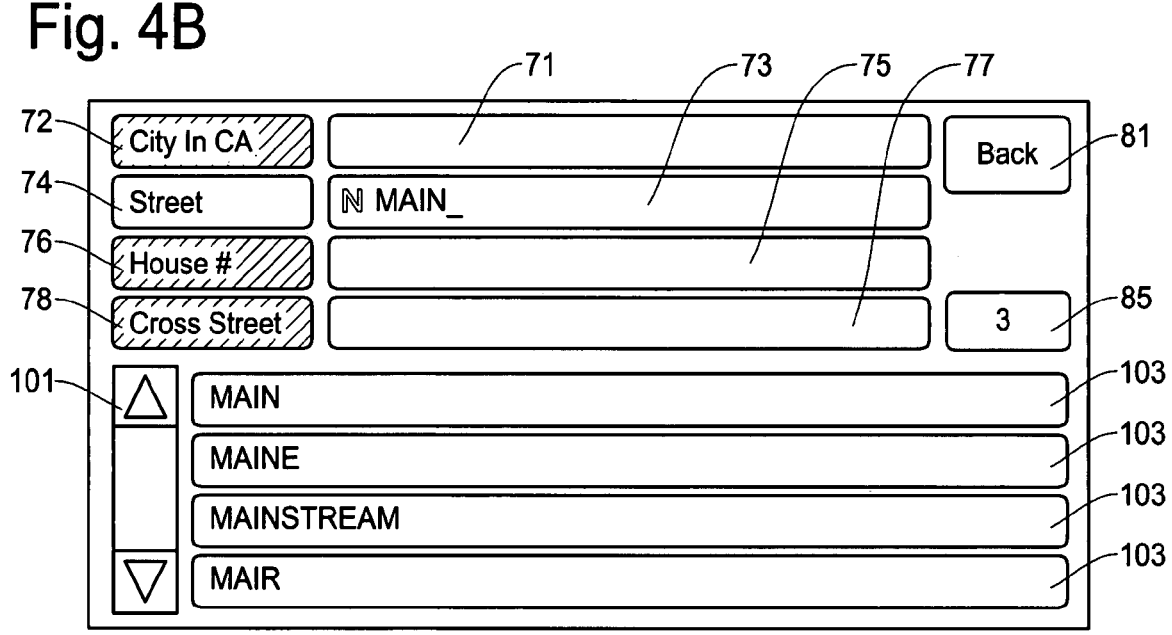

As shown in FIG. 4B, when the matching street names are narrowed to a certain amount of entries, the navigation system lists the matching entries as candidate street names from which the user can select the desired entry. The navigation system can automatically move to the screen of FIG. 4B when the matching entries are limited to a certain number. Alternatively, the user may press the list key 87 or the "Go" key 97 to change the screen from FIG. 4A to FIG. 4B. In FIG. 4B, four street name entries 103 are listed, and scroll key 101 enables the user to scroll up and down the matching entries.

In this case, the navigation system searches the base name of the street and lists base name of the matching entries (exact match as well as best match). For example, the first entry is "MAIN" but not "N MAIN", and the second entry is "MAINE" but not "N MAINE". Those entries satisfy the base name in the input data that has been entered by the user. That is, the entries that satisfy the base name "MAIN" in California are listed. Although the last entry "MAIR" does not match the "MAIN", it is also listed as a best match entry.

Figure 4C:
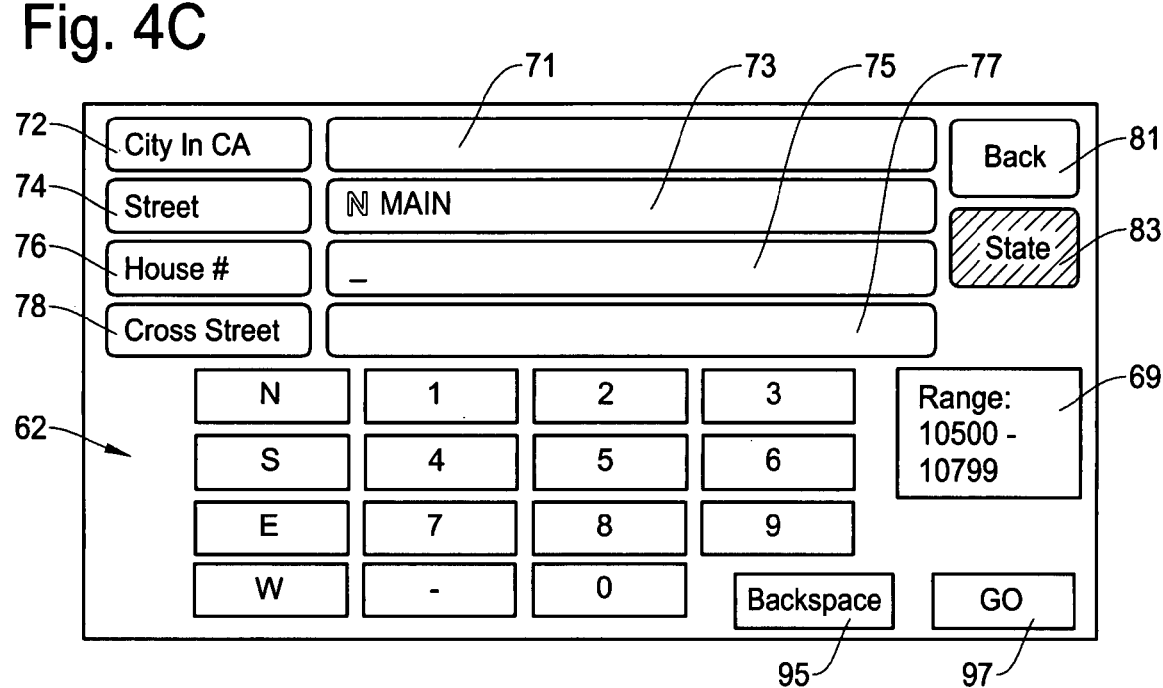

After the user selects the entry "MAIN" from the list in the display shown in FIG. 4B, the navigation system changes the screen to that shown in FIG. 4C to receive a street number (house number). The numeric keyboard 62 is now displayed so that the user can enter the house number on the street name "MAIN". As shown in FIG. 4C, the cursor is also moved to the house number input field 75. The possible number range for the selected street is shown in the range indicator 69. In this example, the range between 10500 to 10799 is shown in the range indicator 69.

Figure 4D:
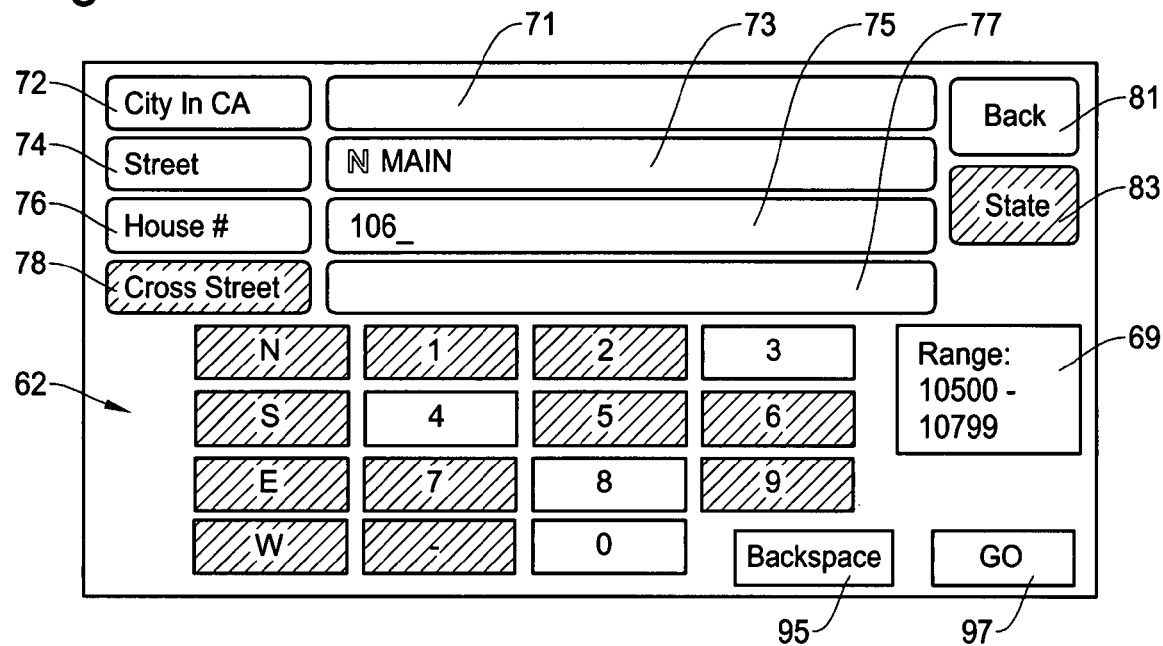

FIG. 4D shows the display where the user has input the house number "106" in the house number input field 75. The navigation system disables some keys of the numeric keyboard 62 and indicates disabled keys by dimming them while keeping enable keys in a normal color (or highlighted) to help the user to enter possible numbers that can follow the street number input. For the number indicated in the range indicator 69 and the operation to dim the keyboard for input assistance, the navigation system uses the base name database, rather than the full name database, for determining the candidate addresses.

Thus, in the present case, the navigation system considers the base name "MAIN" and does not limit the search range of the street number to "N MAIN". That is, even when a plurality of street name having the base name of "MAIN" exist, the navigation system does not limit the range to "N MAIN" but consider all the street names having the base name of "MAIN". This allows the navigation system to produce a wider range of candidate street names even when the user has entered an incorrect prefix.

Figure 4E:
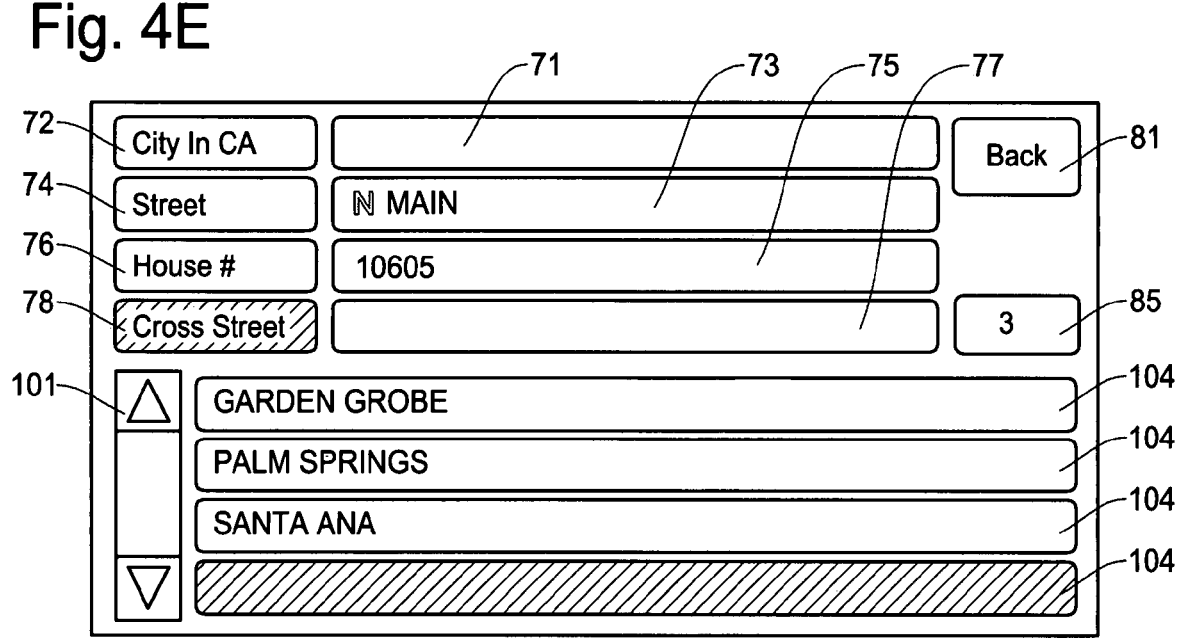

When the navigation system determines that a plurality of cities exist that satisfy the street name and house number, the navigation system will prompt the user to select the desired city as shown in FIG. 4E. Since the number of matching city is limited, the navigation system can list candidate cities from which the user can select one of them. In the example of FIG. 4E, three city entries are listed in the candidate city list 104. The step of selecting a candidate city as shown in FIG. 4E may be omitted if only one city matches the street name and the house number that have been set in the previous process.

Figure 4F:
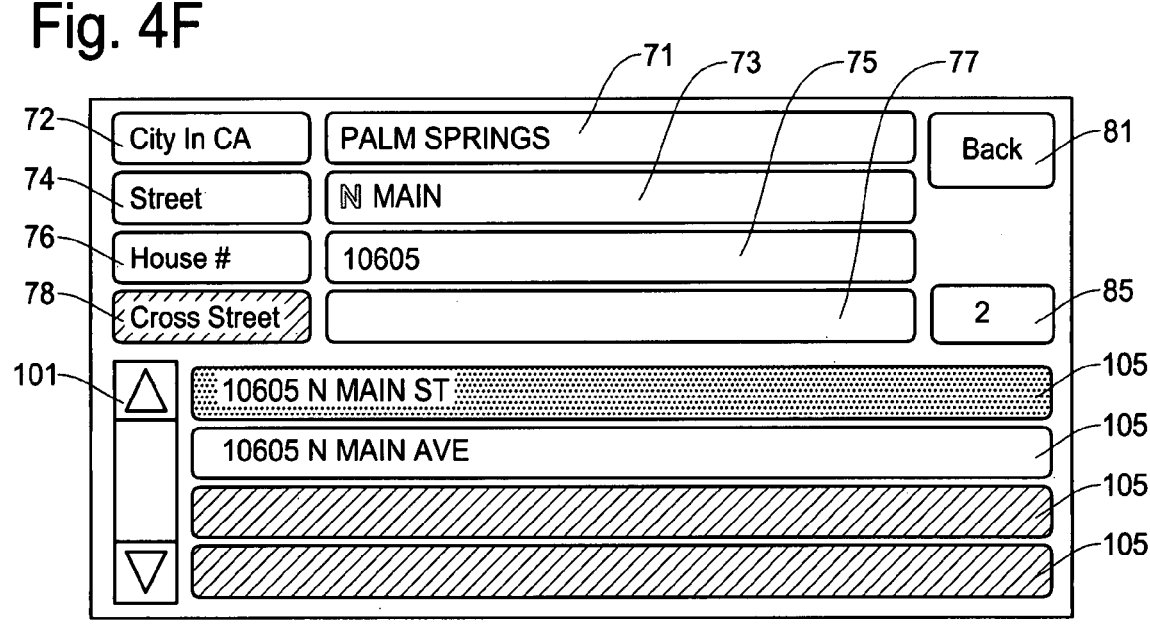
Figure 4G:
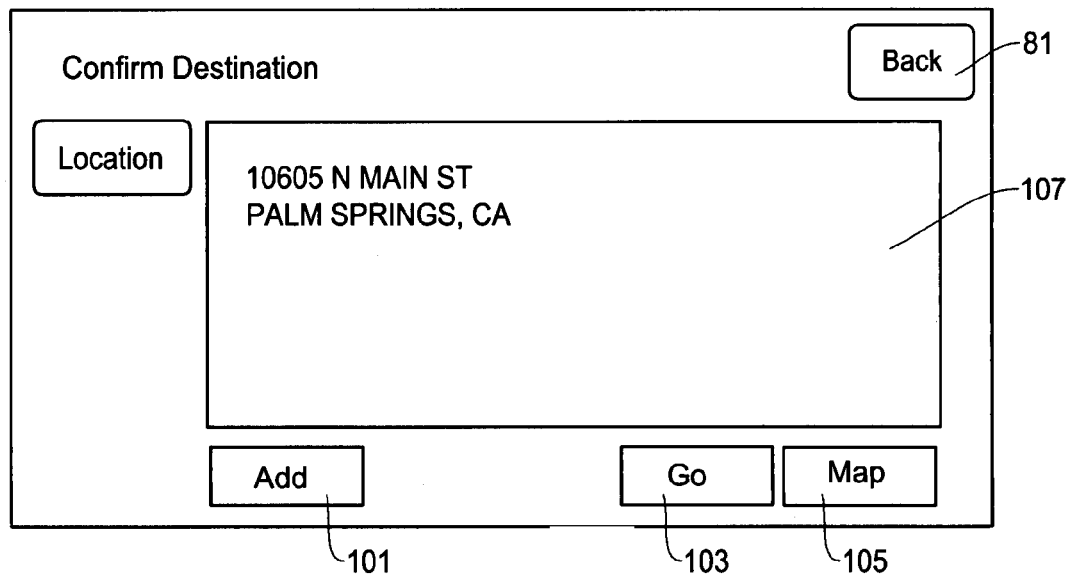

FIGS. 4F and 4G show an example of final stage in the process of determining the address of the destination where the user has selected "PALM SPRINGS" from the city list 104 in FIG. 4E. This example shows a case where the prefix "N" and the base name "MAIN" entered by the user match with a full name in the full name database. In this example, "10605 N MAIN ST" and "10605 N MAIN AVE" are listed as the candidate addresses that satisfy the street name "N MAIN" and street number "10605" in the city of "PALM SPRINGS".

When the user selects the address "10605 N MAIN ST" in FIG. 4F, the navigation system displays a confirmation screen of FIG. 4G to confirm the destination. The user can either confirm the address shown in an address window 107 as the destination or go back to modify the address. In this display example, a back key 81, an add key 101, go key 103 and a map key 105 are shown. By pressing the back key 81, the user can return to the previous screen and modify the input. The add button 101 is used to add the address to the user's address book so that the address can be reused later. The "Go" key 103 is used to start the route calculation and guidance to the address of the destination shown in the address window 107. The map key 105 is used to shows the address on a map image.

Figure 4H:
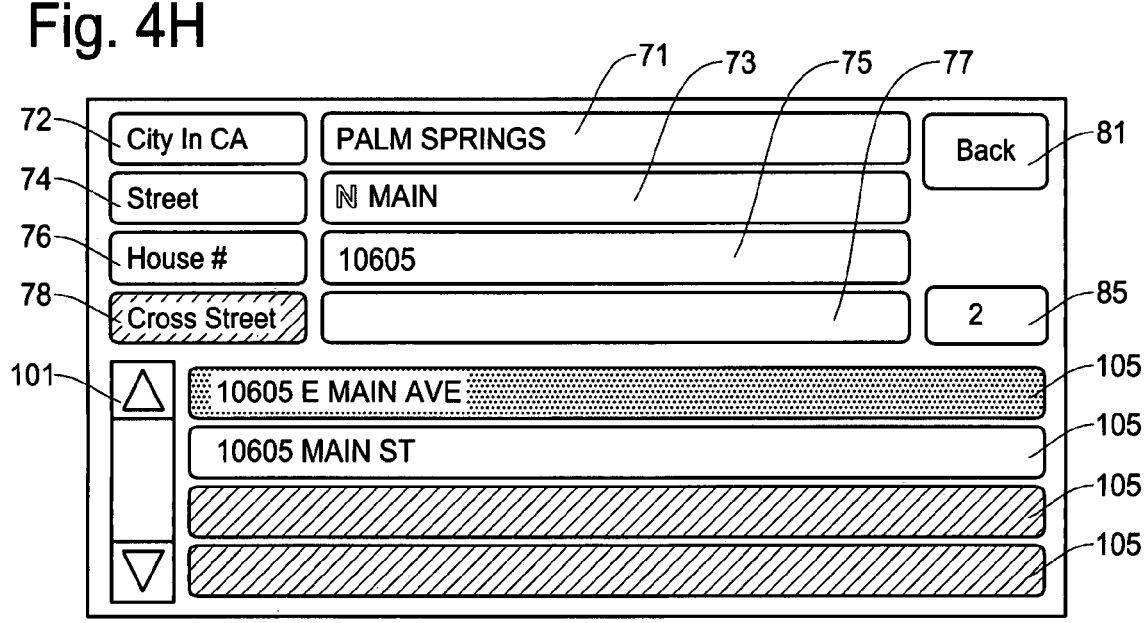
Figure 4I:
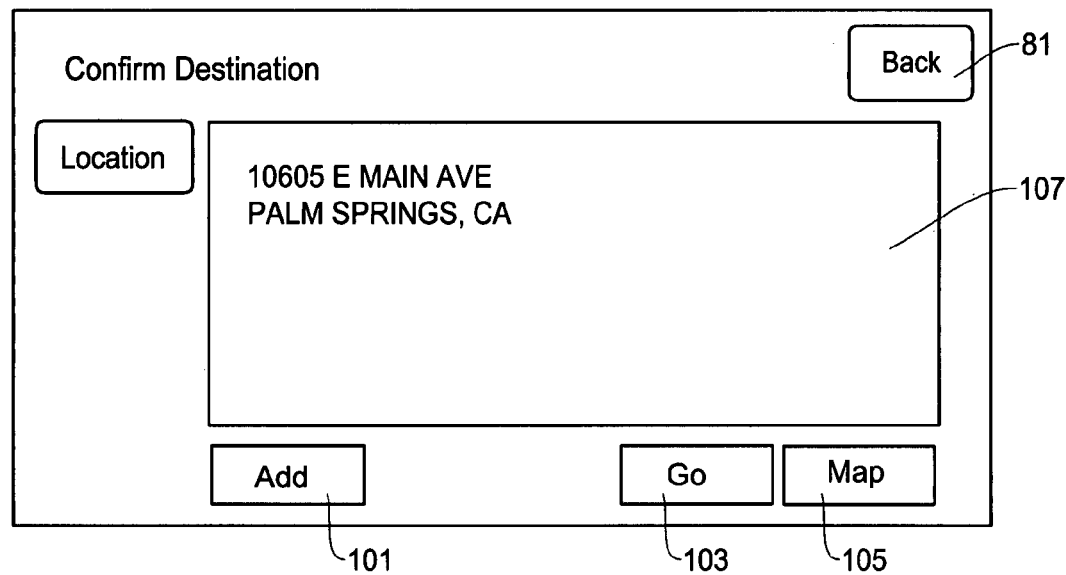

FIGS. 4H and 4I show another example of final stage in the process of determining the address of the destination where the user has selected "PALM SPRINGS" from the city list 104 in FIG. 4E. This example shows a case where the prefix "N" and the base name "MAIN" entered by the user do not match with a full name in the full name database, i.e, there is no entries which exactly match the "N MAIN". Accordingly, in this example, "10605 E MAIN AVE" and "10605 MAIN ST" are listed as the candidate addresses that best match the street name "N MAIN" and street number "10605" in the city of "PALM SPRINGS".

Figure 2A:
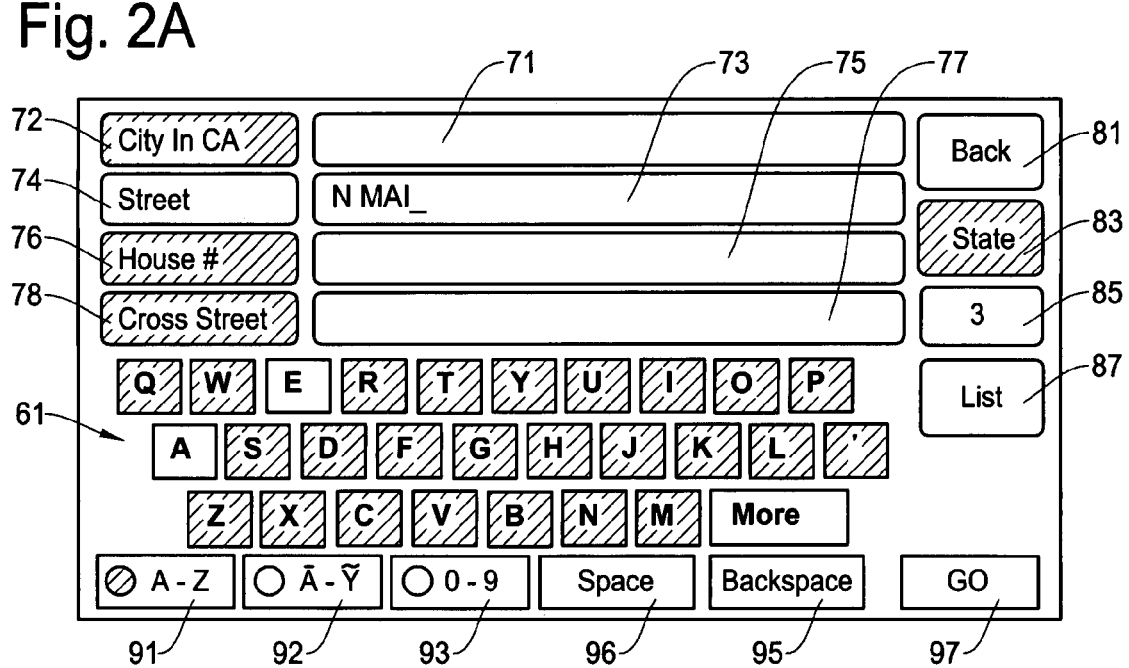
FIGS. 2A-2D are displays showing an input screen that accepts the user's input of a street name through a full name input method where a street name including the prefix is being entered and the searched street names are based on all of the characters input by the user.
Figure 2B:
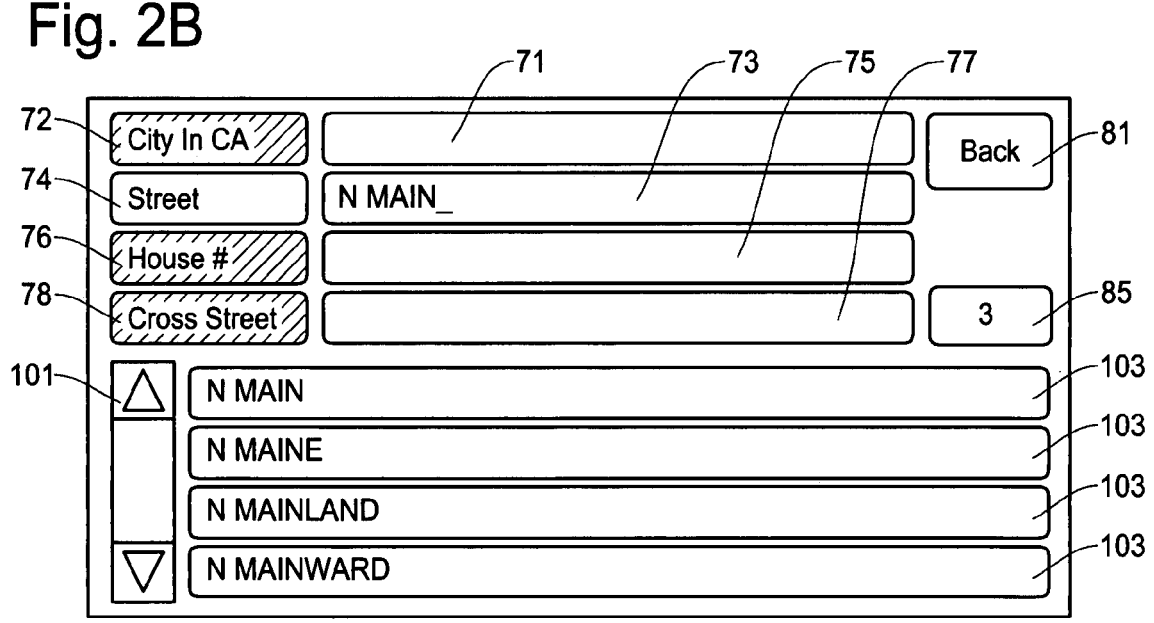
Figure 2C:
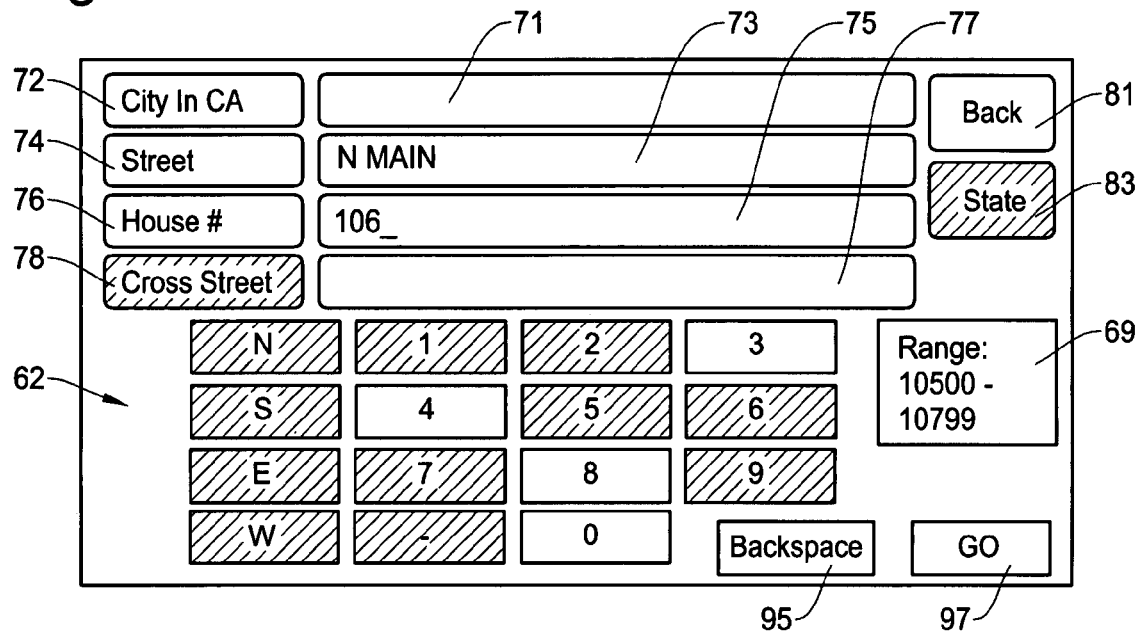
Figure 2D:
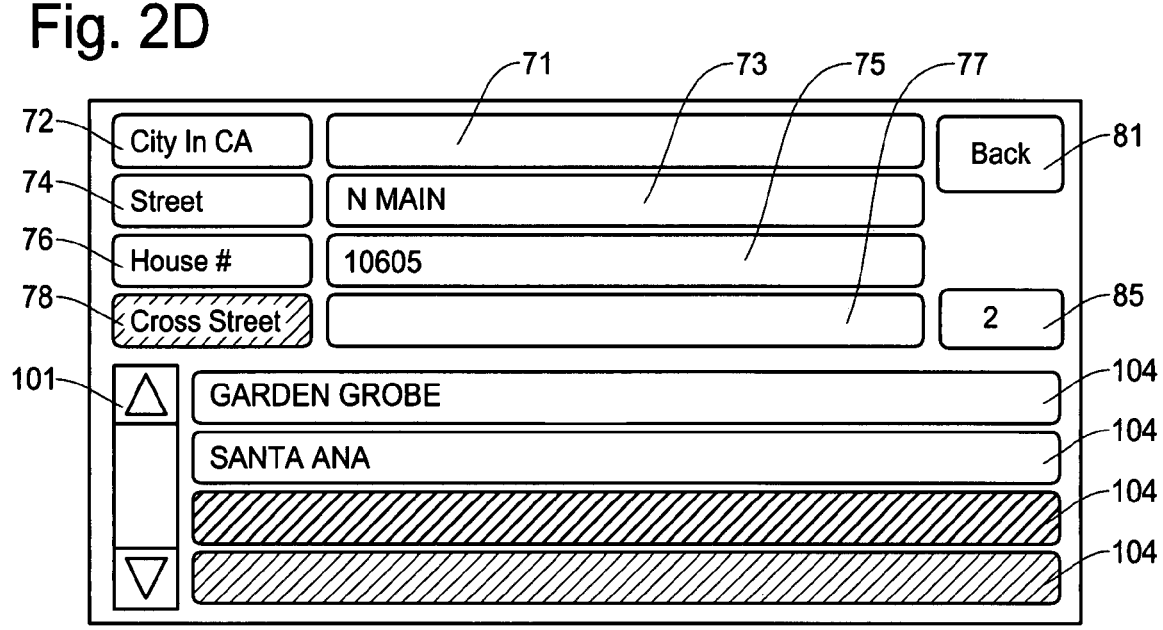

This situation corresponds to that shown in FIG. 2D in which the navigation system cannot retrieve the intended address "10605 E MAIN AVE" in "PALM SPRINGS" because the user has input the incorrect prefix "N" in the full name search method. Unlike the conventional example of FIG. 2D, since the base name search is conducted until the process of FIG. 4E, the scope of search is broadened to include the city "PALM SPRINGS". In other words, if the matching street names having the prefix "N" does not exist in the full name database, the navigation system disregards the prefix "N" that has been input since the street name "N MAIN" does not result in matching addresses in the condition described above.

The navigation system lists the address entries retrieved from the full name database that match the street name "N MAIN" as well as the house number in "PALM SPRINGS". Thus, in the final stage of FIG. 4H, the navigation system lists the full name address "10605 E MAIN AVE" as a best match candidate. When the user selects the address "10605 E MAIN AVE" in FIG. 4H, the navigation system displays a confirmation screen of FIG. 4I to confirm the destination.

Figure 4J:
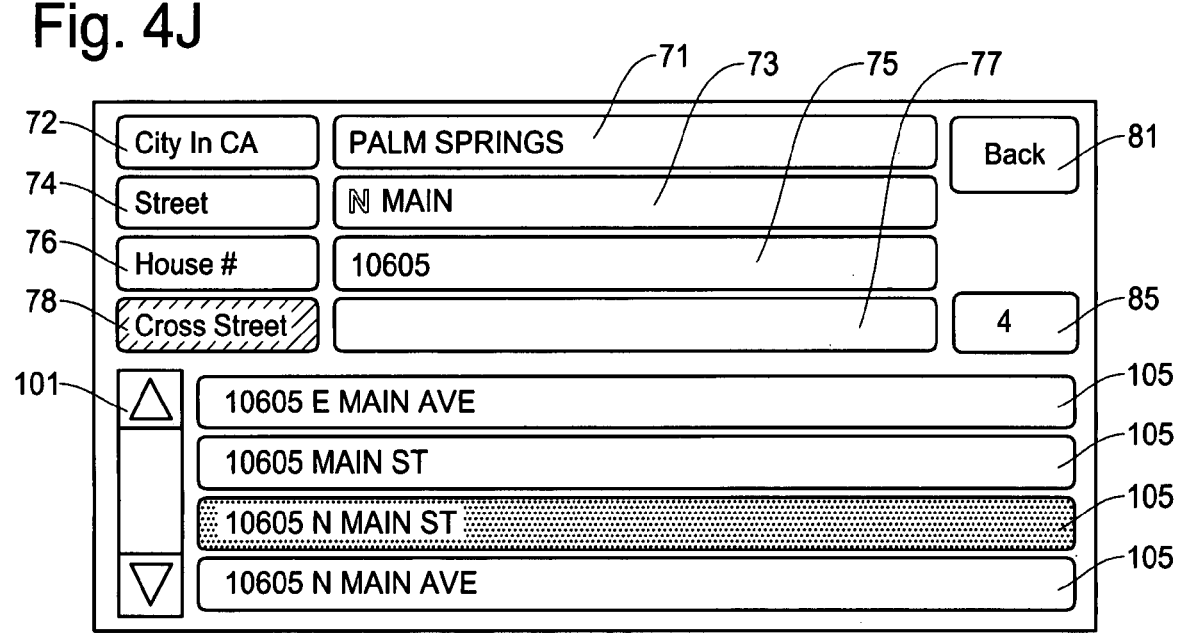
Figure 4K:
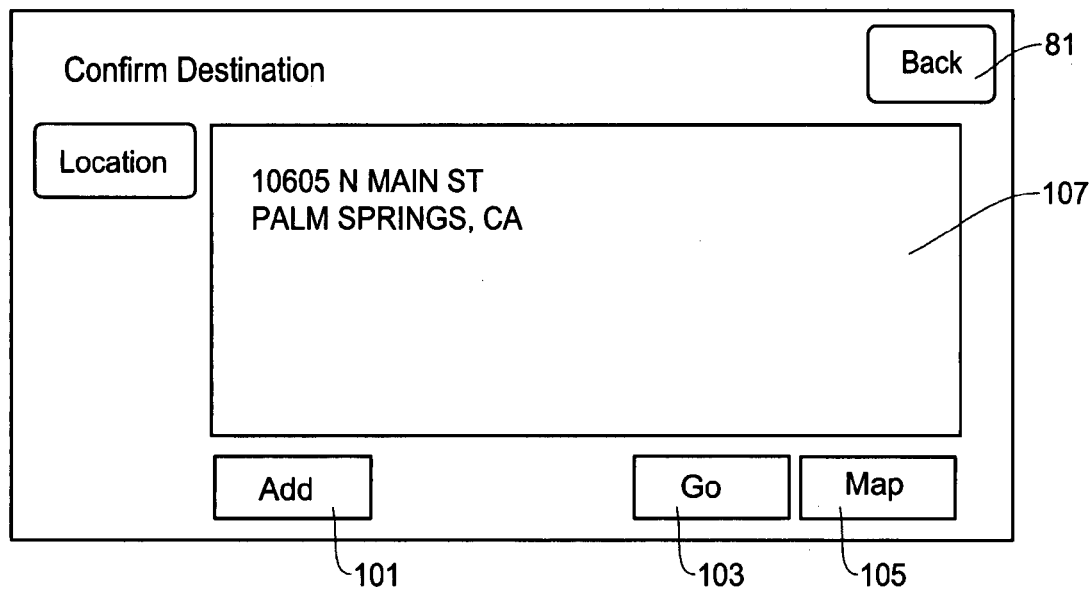

FIGS. 4J and 4K show a further example of final stage in the process of determining the address of the destination where the user has selected "PALM SPRINGS" from the city list 104 in FIG. 4E. This example shows a case of combined situation of both FIGS. 4F and 4H. Accordingly, in this example, "10605 E MAIN AVE", "10605 MAIN ST", "10605 N MAIN ST" and "10605 N MAIN AVE" are listed as the candidate addresses that exactly match as well as best match the street name "N MAIN" and house number "10605" in the city of "PALM SPRINGS". When the user selects one of the addresses in FIG. 4J, the navigation system displays a confirmation screen of FIG. 4K to confirm the destination.

FIGS. 5A-5K are display examples of the present invention showing another example of the remaining part of the process after the process of FIGS. 3A-3C for searching the street name. In this example, the prefix of the street name is unchanged in the street name input field and is displayed in the same manner as input by the user. In other words, in this example, the prefix is displayed along with the base name although the prefix is ignored during the search process until the final stage.

Figure 5A:
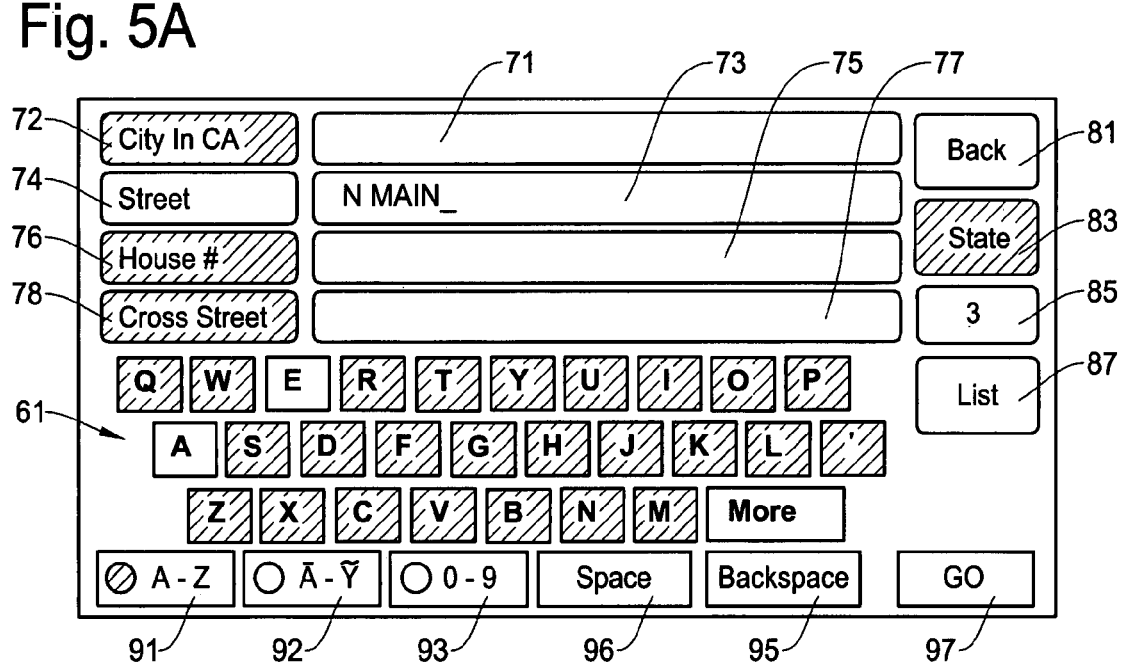
FIGS. 5A-5K are display examples in the embodiment of the present invention showing another example of the remaining part of the process after the process of FIGS. 3A-3C for searching the street name where the prefix of the street name is unchanged in the input field although it is not considered during the process where

In FIG. 5A, the input data "N MAIN" is displayed in the street name input field 73 without distinction between the prefix and base name by a color or brightness. This method is effective in that the user is not surprised by the sudden change of the color or brightness of the character that arises in the example of FIG. 4A-4K. Although there is no change of the non-base name element from the rest of the characters (base name element) on the screen, through repeated use of the navigation system, the user will recognize that some distinction exists between the non-base name and the base name. This is because the search process described below hints the user that the prefix "N" in the street name input field 73 is not used in the search process. Thus, the user who initially did not know of the functionality that allows the user to enter base name will realize that the navigation system can distinguish between the base name element and non-base name element and use only the base name.

Figure 5B:
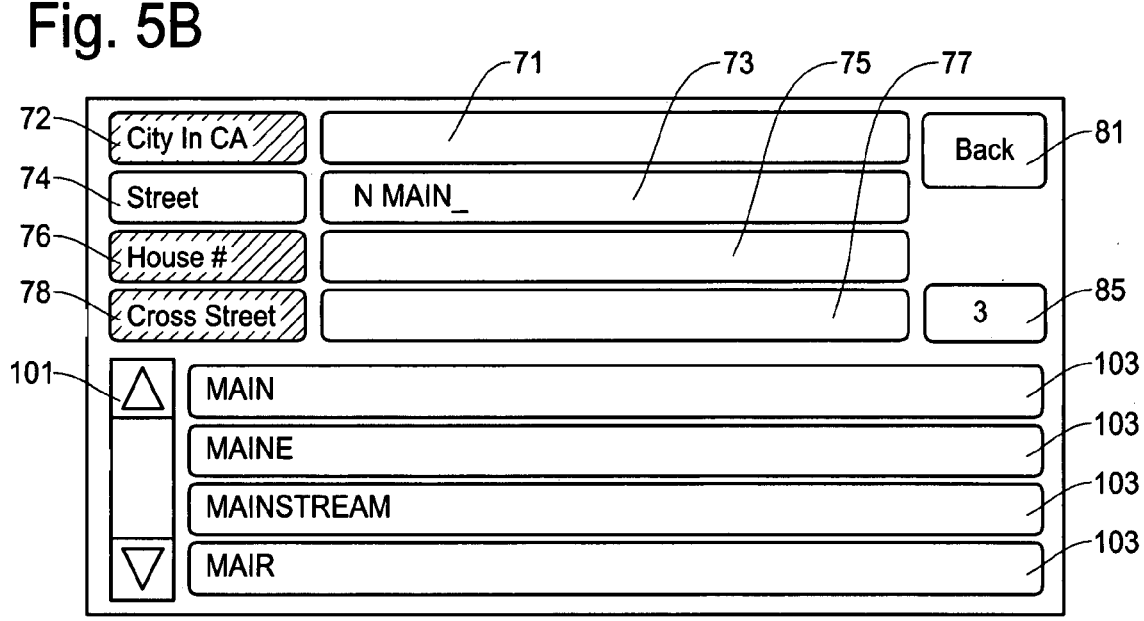

As shown in FIG. 5B, when the matching street names are narrowed to a certain amount of entries, the navigation system lists the matching entries as candidate street names from which the user can select the desired entry. The navigation system can automatically move to the screen of in FIG. 5B when the matching entries are limited to a certain number. Alternatively, the user may press the list key 87 or the "Go" key 97 to change the screen from FIG. 5A to FIG. 5B. In FIG. 5B, four matching entries of street name are listed, and scroll key 101 enables the user to scroll up and down the matching entries.

In this case, the navigation system searches the base name of the street and lists base name of the matching entries (exact match as well as best match). For example, the first entry is "MAIN" but not "N MAIN", and the second entry is "MAINE" but not "N MAINE". Those entries satisfy the condition that has been entered by the user. That is, entries that satisfy the base name "MAIN" in California are listed. Although the last entry "MAIR" does not match the base name "MAIN", it is also listed as a best match entry.

Figure 5C:
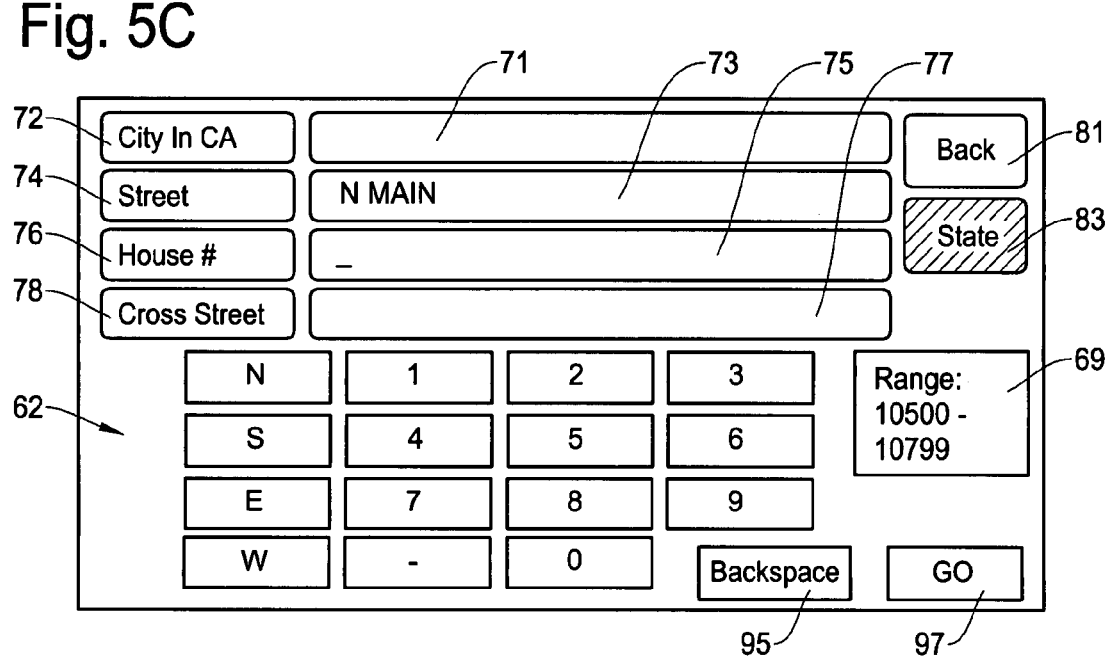

After the user selects the entry "MAIN" from the list in the display shown in FIG. 5B, the navigation system changes the screen to that shown in FIG. 5C to receive a street number (house number). The numeric keyboard 62 is now displayed so that the user can enter the house number on the street name "MAIN". As shown in FIG. 5C, the cursor is also moved to the house number input field 75. The possible number range for the selected street is shown in the range indicator 69. In this example, the range between 10500 to 10799 is shown in the range indicator 69.

Figure 5D:
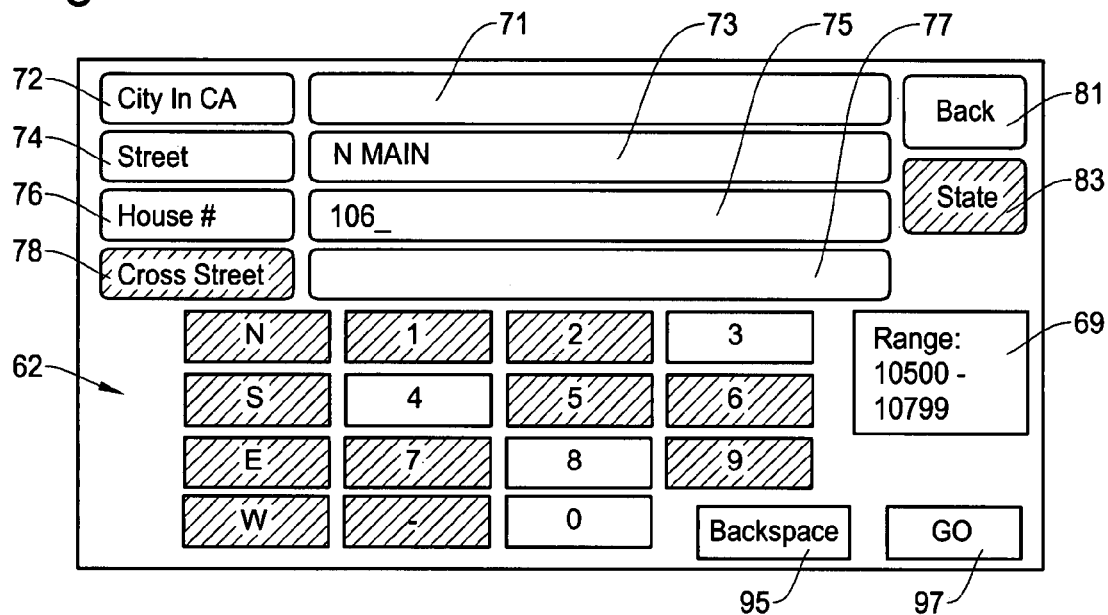

FIG. 5D shows the display where the user has input the house number "106" in the house number input field 75. The navigation system will disable some keys of the numerical keyboard 62 and indicate disabled keys by dimming them while keeping enable keys in a normal color (or highlighted) to help the user to enter possible numbers that can follow the street number input. For the number indicated in the range indicator 69 and the operation to dim the keyboard for input assistance, the navigation system uses the base name database, rather than the full name database, for determining the possible street number.

In the present case, the navigation system considers the base name "MAIN" and does not limit the range of the street number to "N MAIN". That is, even when a plurality of street name having the base name "MAIN" exist, the navigation system does not limit the search to "N MAIN" but considers all of the street names having the base name of "MAIN". This allows the navigation system to provide a wider range of candidate street names even when the user has entered an incorrect prefix.

Figure 5E:
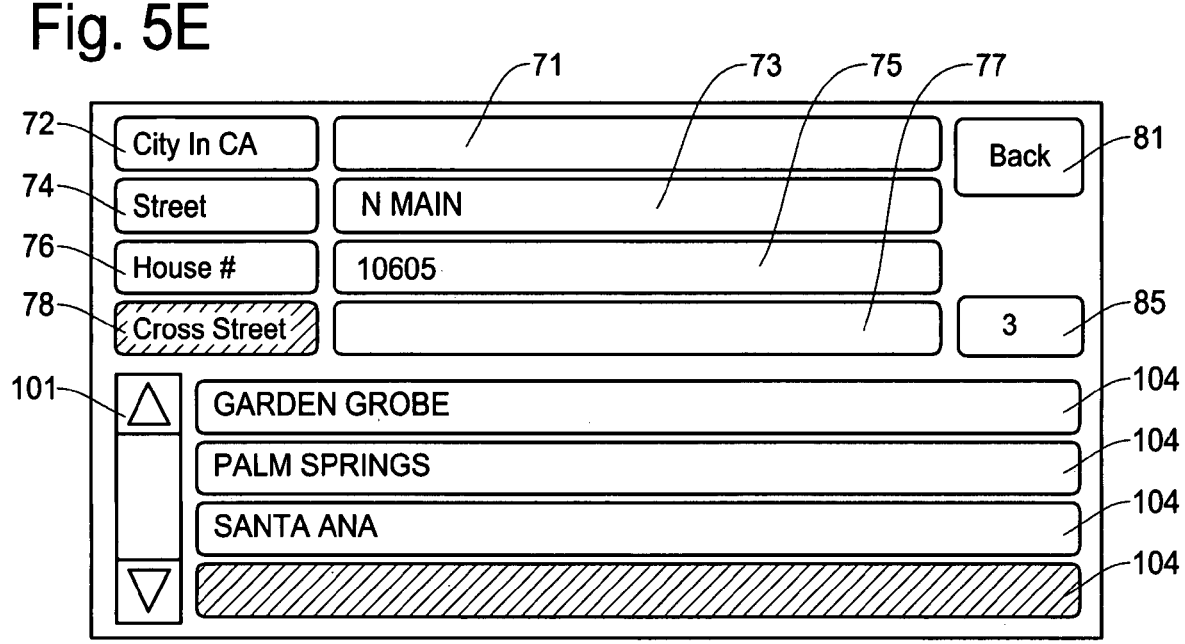

When the navigation system determines that a plurality of cities exist that satisfy the street name and street number, the navigation system will prompt the user to select the desired city as shown in FIG. 5E. Since the number of matching city is limited, the navigation system can list candidate cities from which the user can select one city. In the example of FIG. 5E, three city entries are listed in the candidate city list 104. The step of selecting a candidate city as shown in FIG. 5E may be omitted if only one city matches the street name and the house number that have been set in the previous process.

Figure 5F:
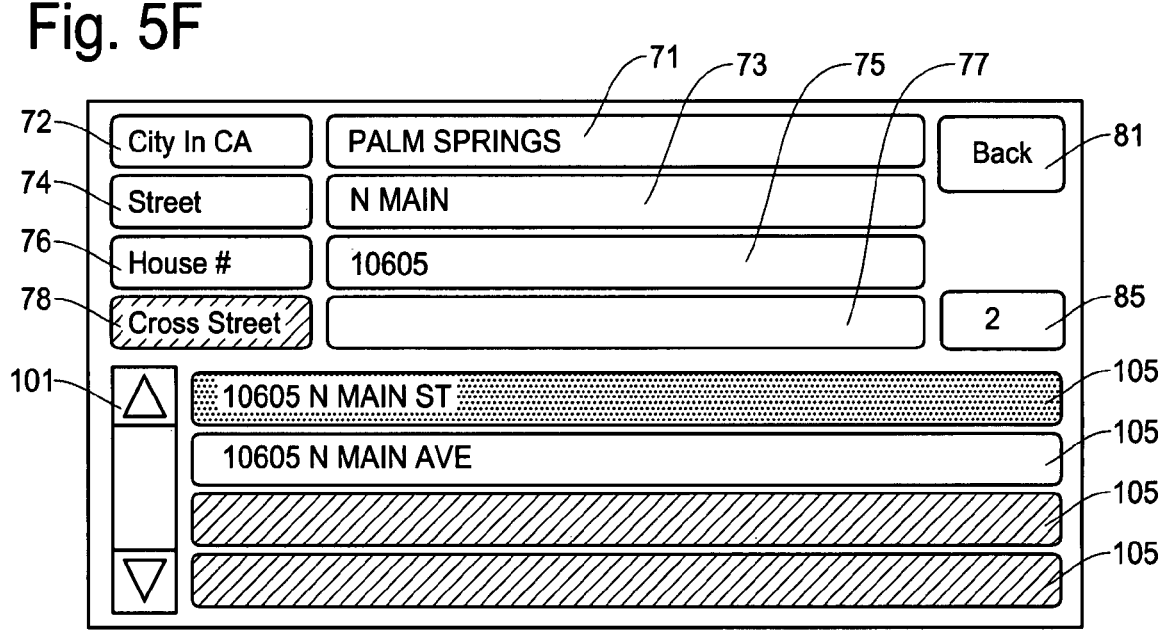
Figure 5G:
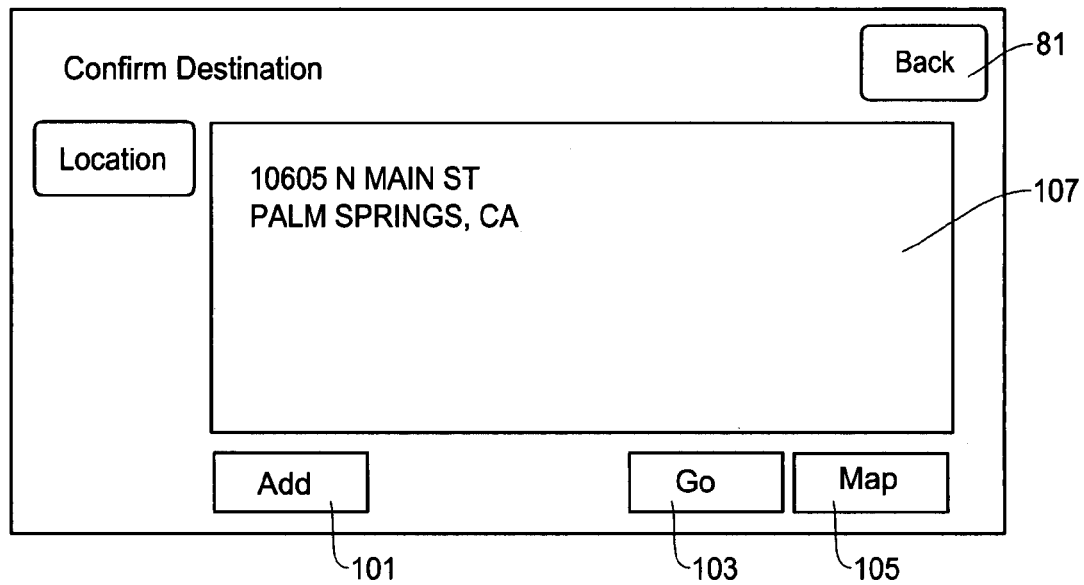

FIGS. 5F and 5G show an example of final stage in the process of determining the address of the destination where the user has selected "PALM SPRINGS" from the city list 104 in FIG. 5E. This example shows a case where the prefix "N" and the base name "MAIN" entered by the user match with a full name in the full name database. In this example, "10605 N MAIN ST" and "10605 N MAIN AVE" are listed as the candidate addresses that satisfy the street name "N MAIN" and street number "10605" in the city of "PALM SPRINGS".

When the user selects the address "10605 N MAIN ST" in FIG. 5F, the navigation system displays a confirmation screen of FIG. 5G to confirm the destination. The user can either confirm the address shown in the address window 107 as the destination or go back to modify the address. By pressing the back key 81, the user can return to the previous screen and modify the input.

Figure 5H:
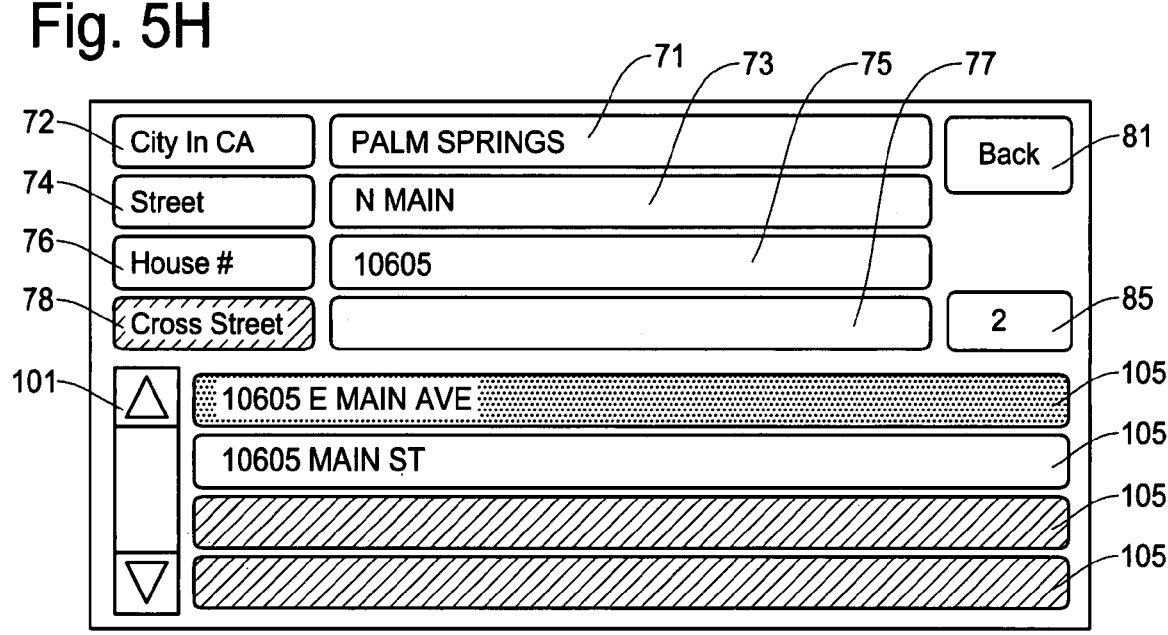
Figure 5I:
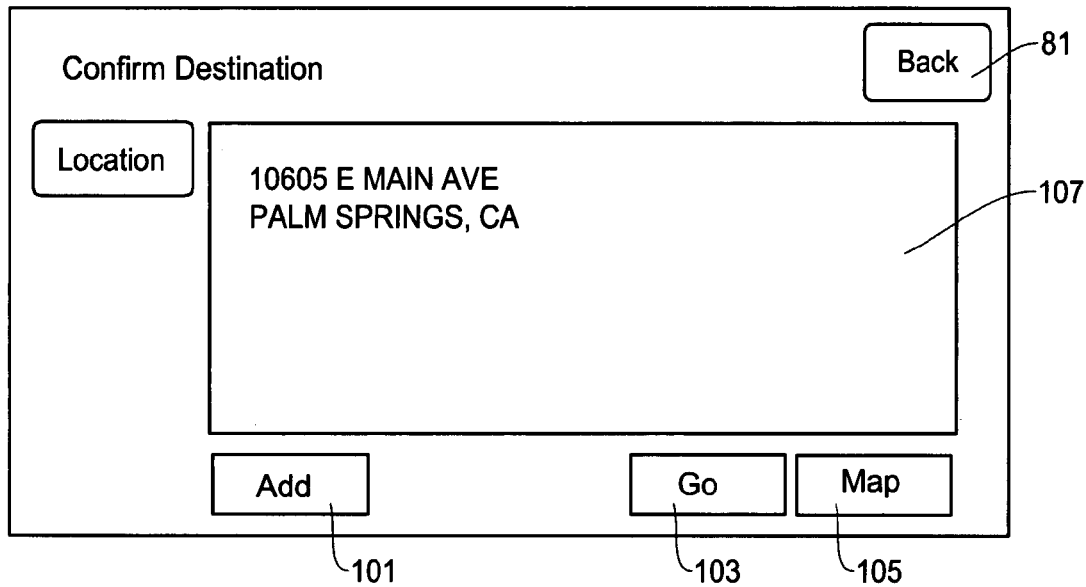

FIGS. 5H and 5I show another example of final stage in the process of determining the address of the destination where the user has selected "PALM SPRINGS" from the city list 104 in FIG. 5E. This example shows a case where the prefix "N" and the base name "MAIN" entered by the user do not match with a full name in the full name database, i.e, there is no entries which exactly match the "N MAIN". Accordingly, in this example, "10605 E MAIN AVE" and "10605 MAIN ST" are listed as the candidate addresses that best match the street name "N MAIN" and street number "10605" in the city of "PALM SPRINGS".

This situation corresponds to that shown in FIG. 2D in which the navigation system cannot retrieve the intended address "10605 E MAIN AVE" in "PALM SPRINGS" because the user has input the incorrect prefix "N" in the full name search method. Unlike the conventional example of FIG. 2D, since the base name search is conducted until the process of FIG. 5E, the scope of search is broadened to include the city "PALM SPRINGS". In other words, if the matching street names having the prefix "N" does not exist in the full name database, the navigation system disregards the prefix "N" that has been input since the street name "N MAIN" does not result in matching addresses in the condition described above.

The navigation system will list address entries retrieved from the full name data base that match the base name as well as the house number. Thus, in the final stage of FIG. 5H, the navigation system lists the address "10605 E MAIN AVE" with the full name as a best match candidate. When the user selects the address "10605 E MAIN AVE" in FIG. 5H, the navigation system displays a confirmation screen of FIG. 5I to confirm the destination.

Figure 5J:
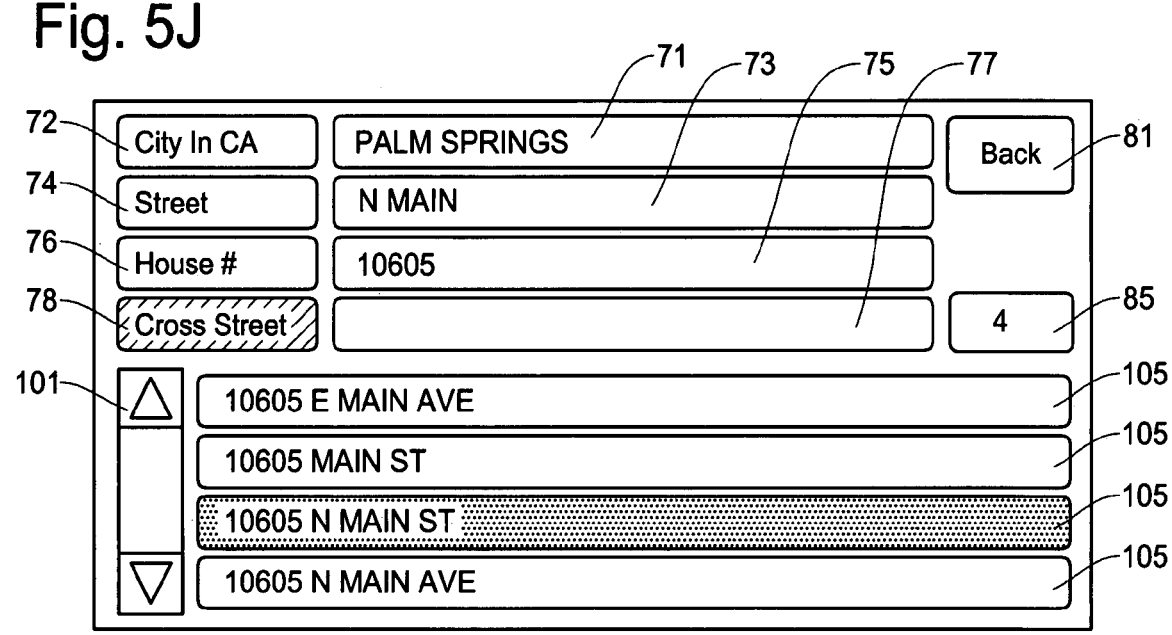
Figure 5K:
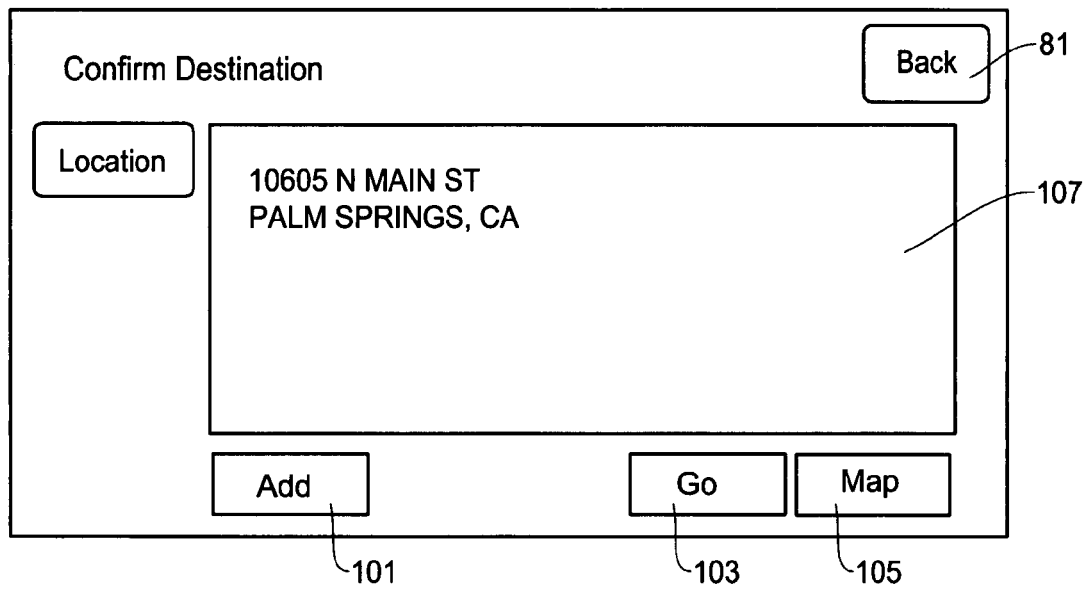

FIGS. 5J and 5K show a further example of final stage in the process of determining the address of the destination where the user has selected "PALM SPRINGS" from the city list 104 in FIG. 5E. This example shows a case of a combined situation of both FIGS. 5F and 5H. Accordingly, in this example, "10605 E MAIN AVE", "10605 MAIN ST", "10605 N MAIN ST" and "10605 N MAIN AVE" are listed as the candidate addresses that exactly match or best match the street name "N MAIN" and street number "10605" in the city of "PALM SPRINGS". When the user selects one of the addresses in FIG. 5J, the navigation system displays a confirmation screen of FIG. 5K to confirm the destination.

FIGS. 6A-6K are display examples of the present invention showing another example of the remaining part of the process after the process of FIGS. 3A-3C for searching the street name. In this example, the prefix of the street name is removed from the street name input field 73 so that only the base name "MAIN" stays therein. In other words, in this example, once the navigation system detects the non-base name element, the prefix "N" in this case, the non-base name element is hidden so that the user can see only the base name "MAIN" during the search process.

Figure 6A:
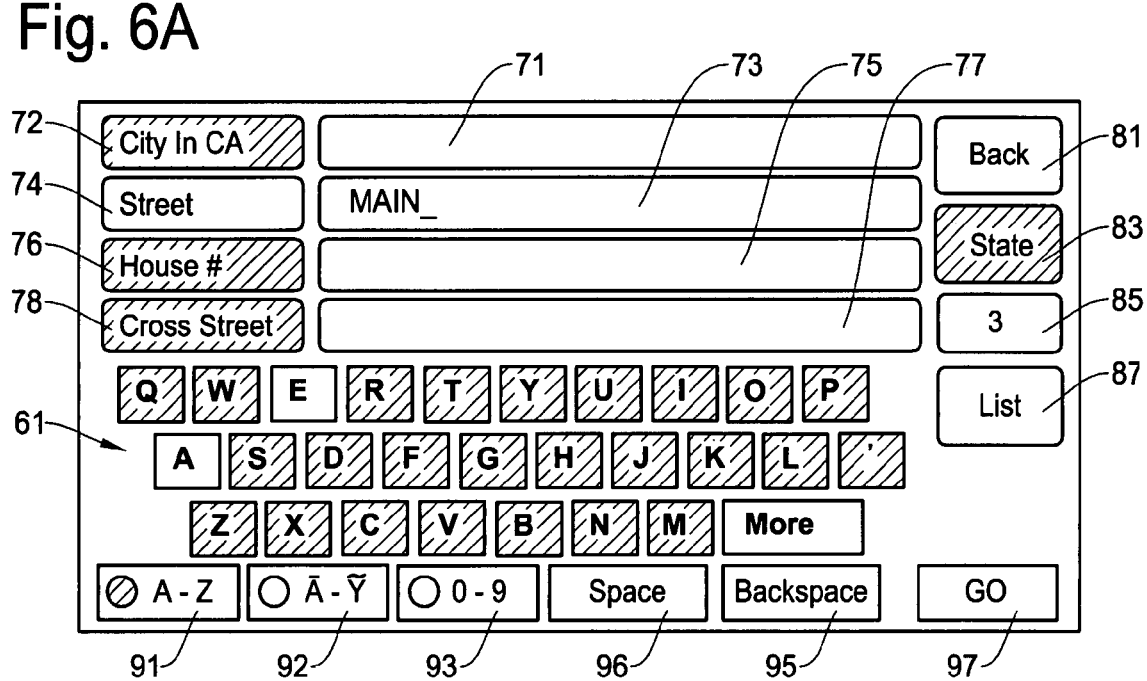
FIGS. 6A-6K are display examples in the embodiment of the present invention showing a further example of the remaining part of the process after the process of FIGS. 3A-3C for searching the street name where the prefix of the street name is removed from the input field during the process where

Therefore, in FIG. 6A, the data "MAIN" is displayed in the street name input field 73 without including the prefix "N". This method is effective to clearly tell the user that a prefix or a suffix is unnecessary during the search process. Since the non-base name element is removed from the rest of the characters (base name element) on the screen, through repeated use of the navigation system, the user will recognize that some distinction exists between the non-base name and the base name. This is because the search process described below hints the user the prefix "N" is not used in the search process. Thus, the user who initially did not know of the function that allows the user to enter base name will realize that the navigation can distinguish between the base name element and non-base name element and use only the base name.

Figure 6B:
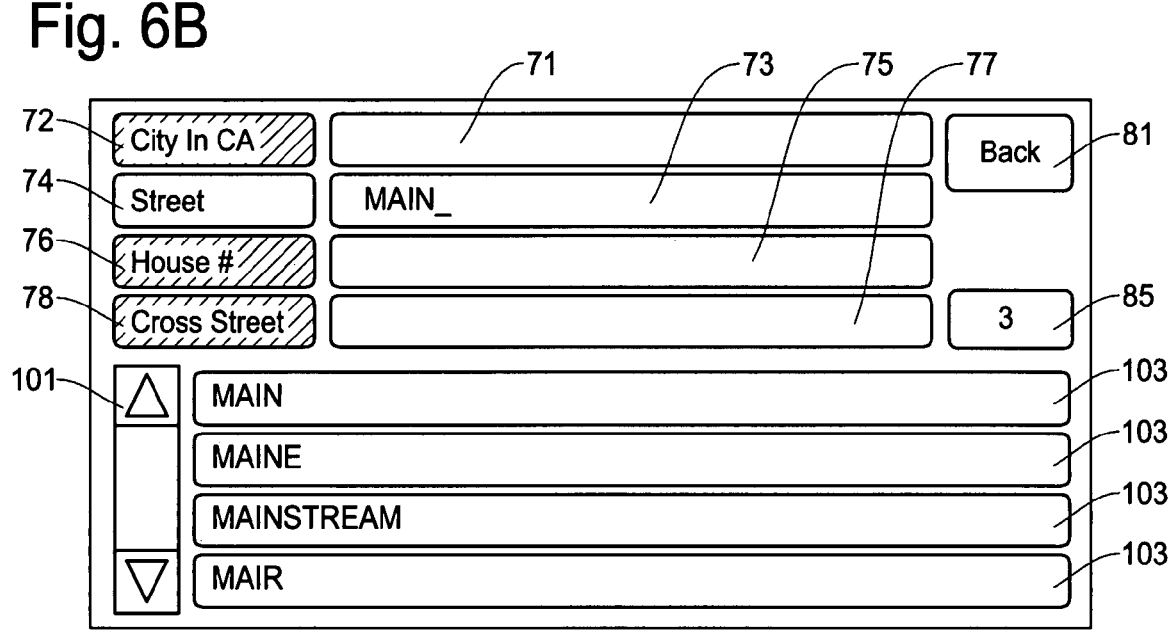

As shown in FIG. 6B, when the matching street names are narrowed to a certain amount of entries, the navigation system lists the matching entries as candidate street names from which the user can select the desired entry. The navigation system can automatically move to the screen of in FIG. 6B when the matching entries are limited to a certain number. Alternatively, the user may press the list key 87 or the "Go" key 97 to change the screen from FIG. 6A to FIG. 6B. In FIG. 6B, four street name entries 103 are listed, and scroll key 101 enables the user to scroll up and down the matching entries.

In this case, the navigation system searches the base name of the street and lists base name of the matching entries (exact match as well as best match). For example, the first entry is "MAIN", and the second entry is "MAINE", and third entry is "MAINSTREAM" all of which satisfy the base name "MAIN". Although the last entry "MAIR" does not match the base name "MAIN", it is also listed as a best match entry.

Figure 6C:
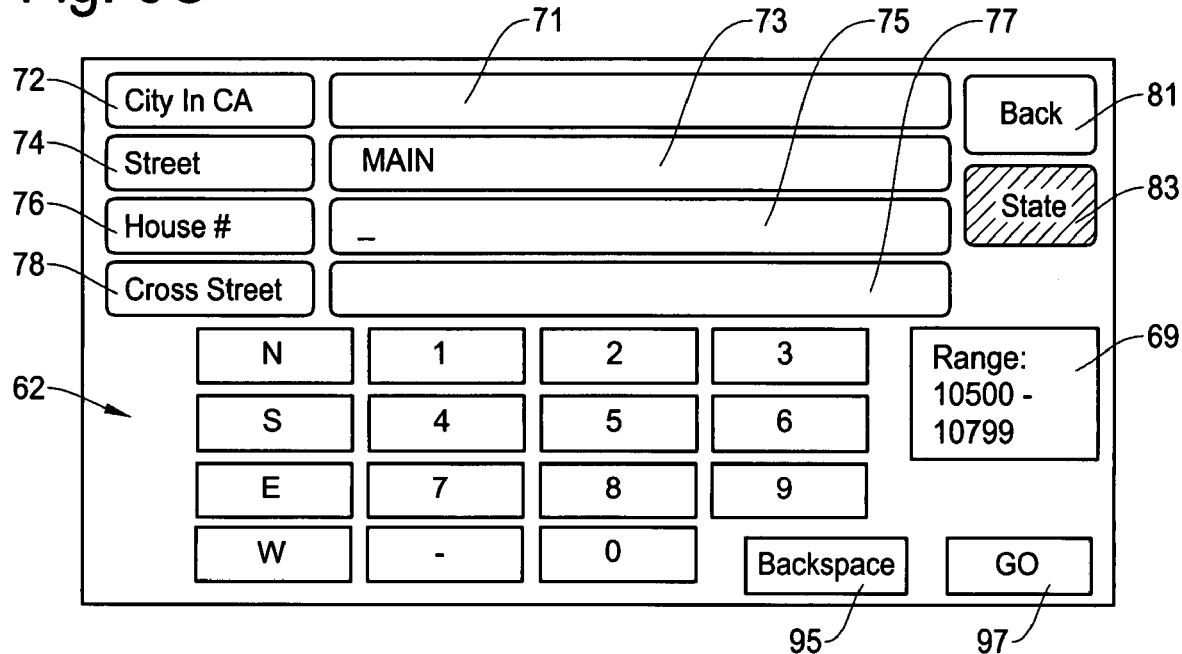

After the user selects the entry "MAIN" from the list in the display shown in FIG. 6B, the navigation system changes the screen to that shown in FIG. 6C to receive a street number (house number). The numeric keyboard 62 is now displayed so that the user can enter the house number of the street name "MAIN". As shown in FIG. 6C, the cursor is also moved to the house number input field 75. The possible number range for the selected street is shown in the range indicator 69. In this example, the range between 10500 to 10799 is shown in the range indicator 69.

Figure 6D:
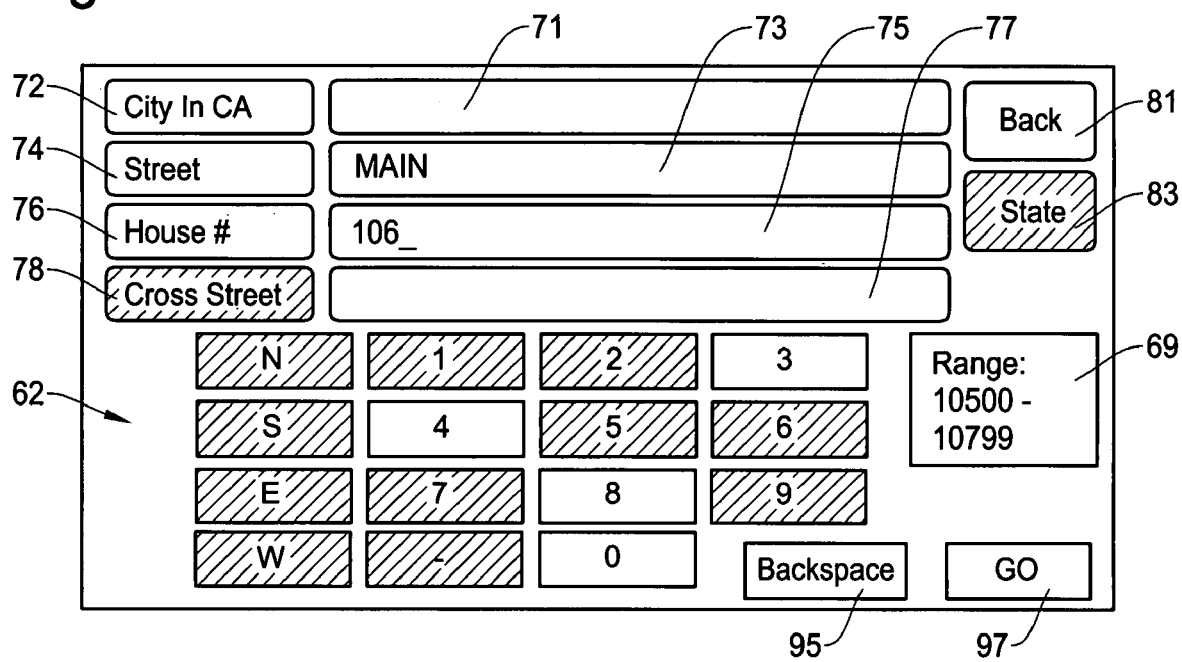

FIG. 6D shows the display where the user has input the house number "106" in the house number input field 75. The navigation system will disable some keys of the numerical keyboard 62 and indicate disabled keys by dimming them while keeping enable keys in a normal color (or highlighted) to help the user to enter possible numbers that can follow the street number input. For the number indicated in the range indicator 69 and the operation to dim the keyboard for input assistance, the navigation system uses the base name database, rather than the full name database, for determining the possible street number.

Figure 6E:
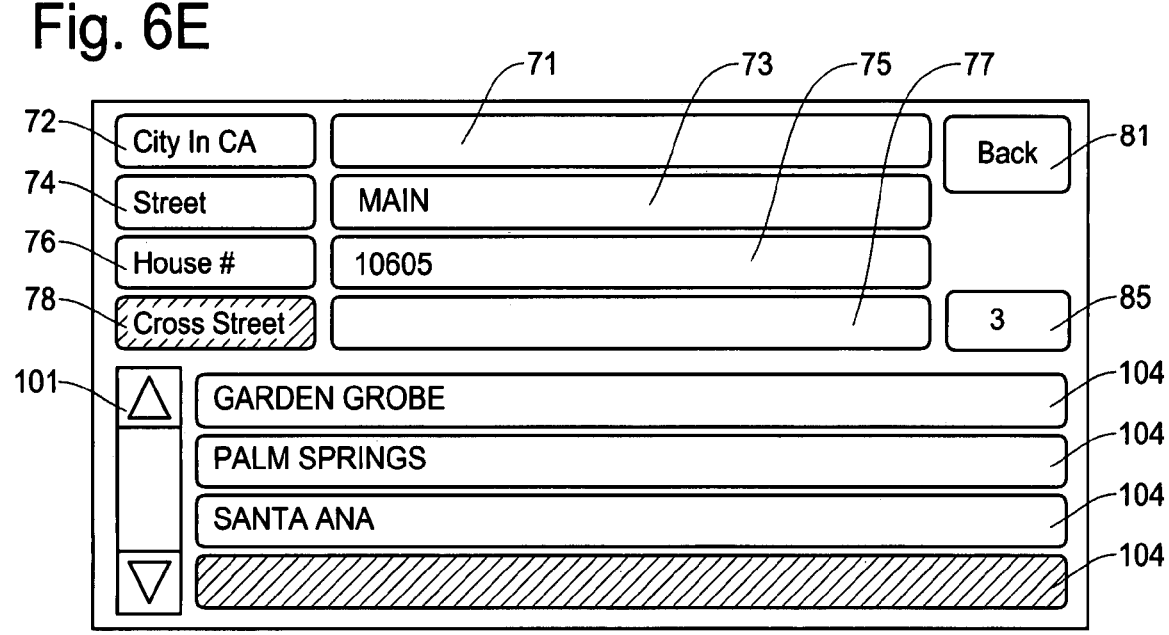

When the navigation system determines that a plurality of cities exist that satisfy the street name and street number, the navigation system will prompt the user to select the desired city as shown in FIG. 6E. Since the number of matching city is limited, the navigation system can list candidate cities from which the user can select one city. In the example of FIG. 6E, three city entries are listed in the candidate city list 104. The step of selecting a candidate city as shown in FIG. 6E may be omitted if only one city matches the street name and the house number that have been set in the previous process.

Figure 6F:
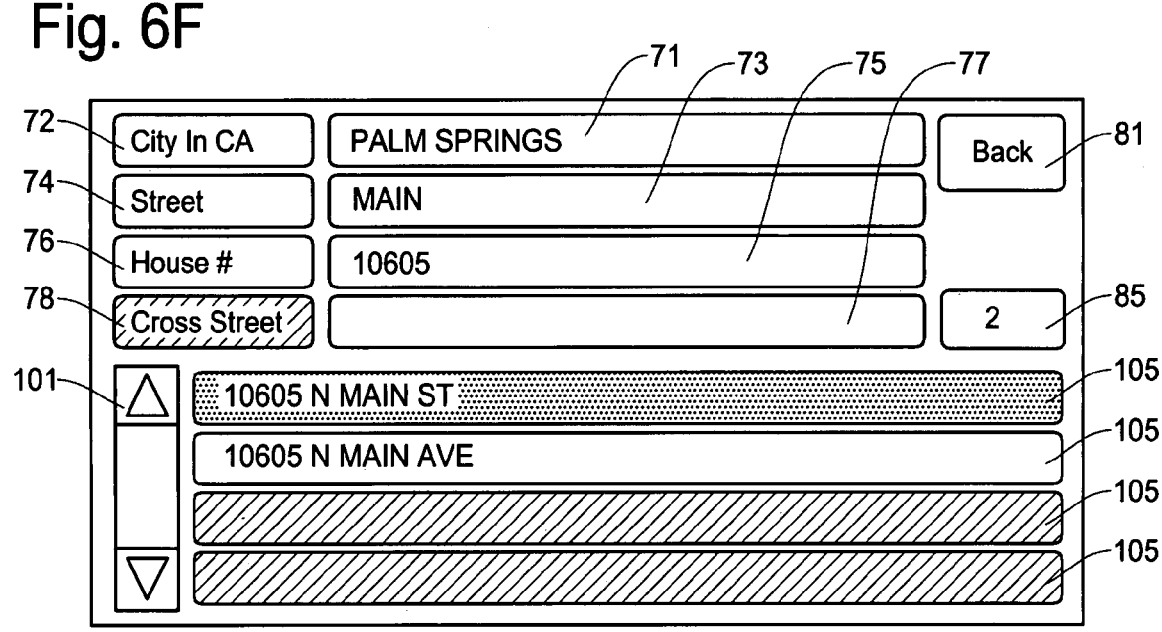
Figure 6G:
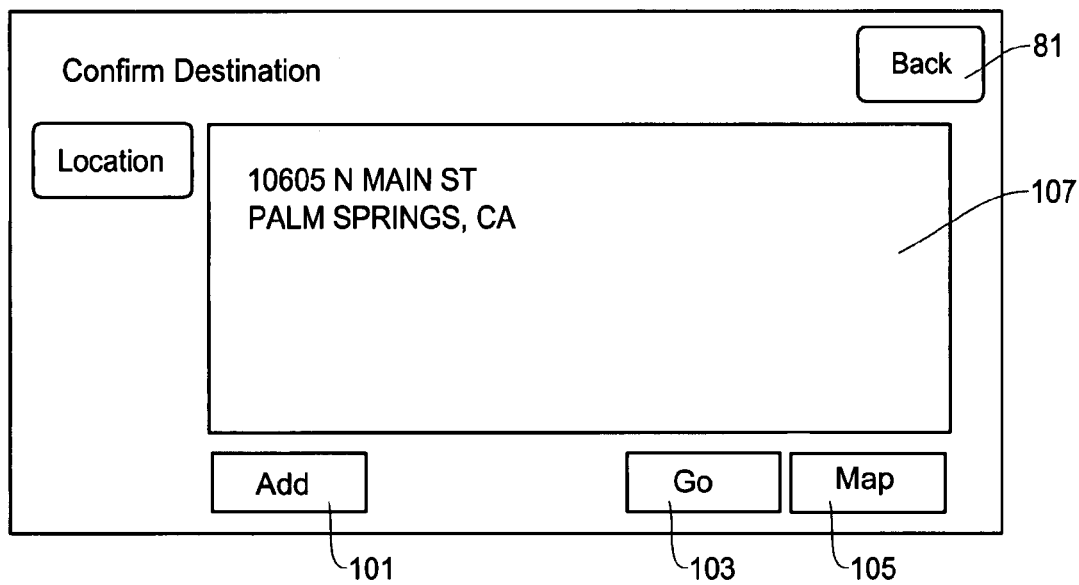

FIGS. 6F and 6G show an example of final stage in the process of determining the address of the destination where the user has selected "PALM SPRINGS" from the city list 104 in FIG. 6E. Although the prefix "N" is hidden, in the final stage, the navigation system considers the prefix as well. This example shows a case where the prefix "N" and the base name "MAIN" entered by the user match with a full name in the full name database. In this example, "10605 N MAIN ST" and "10605 N MAIN AVE" are listed as the candidate addresses that satisfy the street name "N MAIN" and street number "10605" in the city of "PALM SPRINGS".

When the user selects the address "10605 N MAIN ST" in FIG. 6F, the navigation system displays a confirmation screen of FIG. 6G to confirm the destination. The user can either confirm the address shown in the address window 107 as the destination or go back to modify the address. By pressing the back key 81, the user can return to the previous screen and modify the input.

Figure 6H:
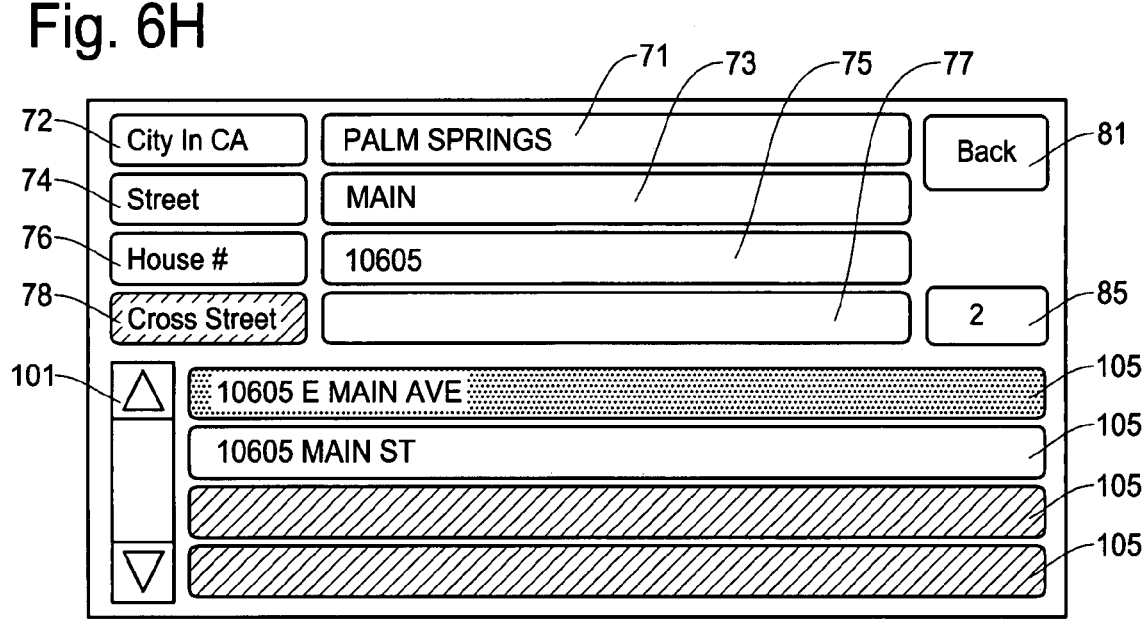
Figure 6I:
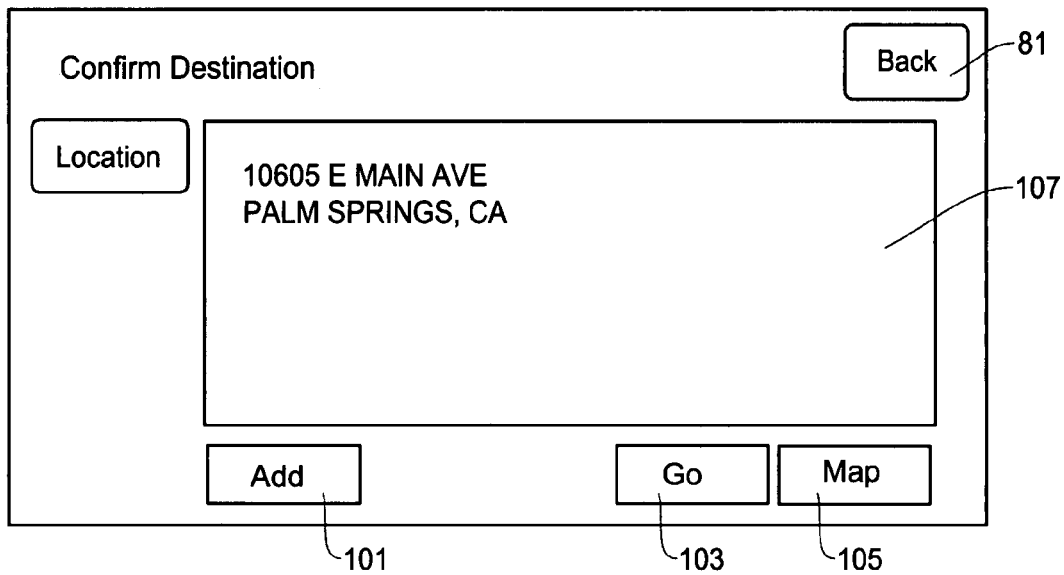

FIGS. 6H and 6I show another example of final stage in the process of determining the address of the destination where the user has selected "PALM SPRINGS" from the city list 104 in FIG. 6E. This example shows a case where the prefix "N" and the base name "MAIN" entered by the user do not match with a full name in the full name database, i.e, there is no entries which exactly match the "N MAIN". Accordingly, in this example, "10605 E MAIN AVE" and "10605 MAIN ST" are listed as the candidate addresses that best match the street name "N MAIN" and street number "10605" in the city of "PALM SPRINGS".

This situation corresponds to that shown in FIG. 2D in which the navigation system cannot retrieve the intended address "10605 E MAIN AVE" in "PALM SPRINGS" because the user has input the incorrect prefix "N" in the full name search method. Unlike the conventional example of FIG. 2D, since the base name search is conducted until the process of FIG. 6E, the scope of search is broadened to include the city "PALM SPRINGS". In other words, if the matching street name having the prefix "N" does not exist in the full name database, the navigation system disregards the prefix "N" that has been input since the street name "N MAIN" does not result in matching addresses in the condition described above.

The navigation system will list address entries retrieved from the full name data base that match the base name as well as the house number. Thus, in the final stage of FIG. 6H, the navigation system lists the address "10605 E MAIN AVE" with the full name as a best match candidate. When the user selects the address "10605 E MAIN AVE" in FIG. 6H, the navigation system displays a confirmation screen of FIG. 6I to confirm the destination.

Figure 6J:
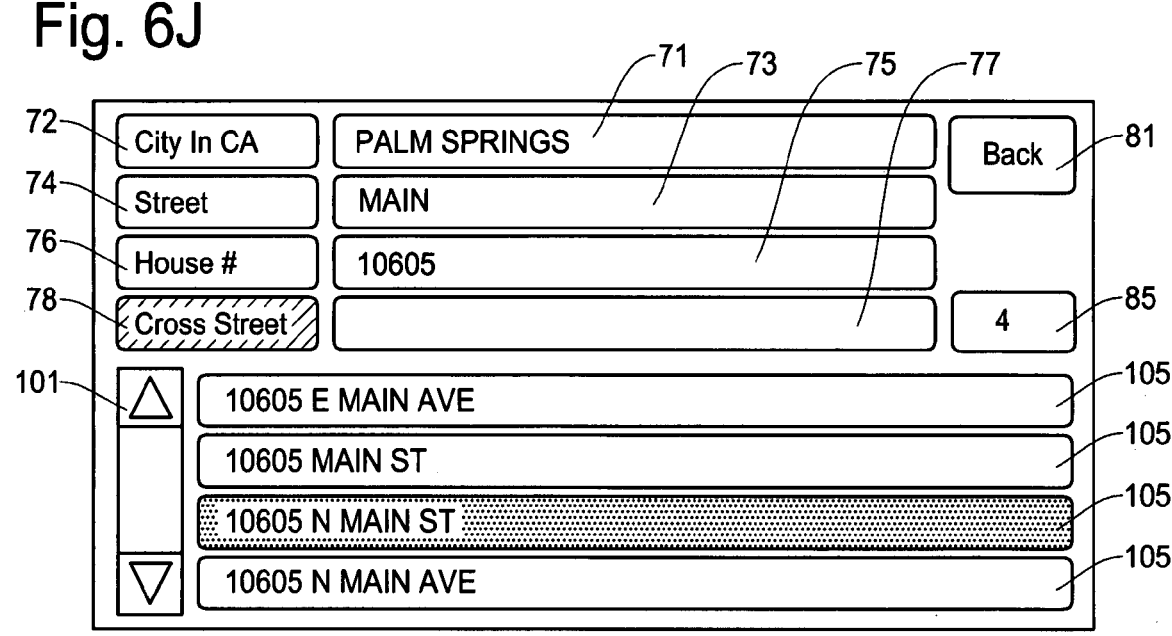
Figure 6K:
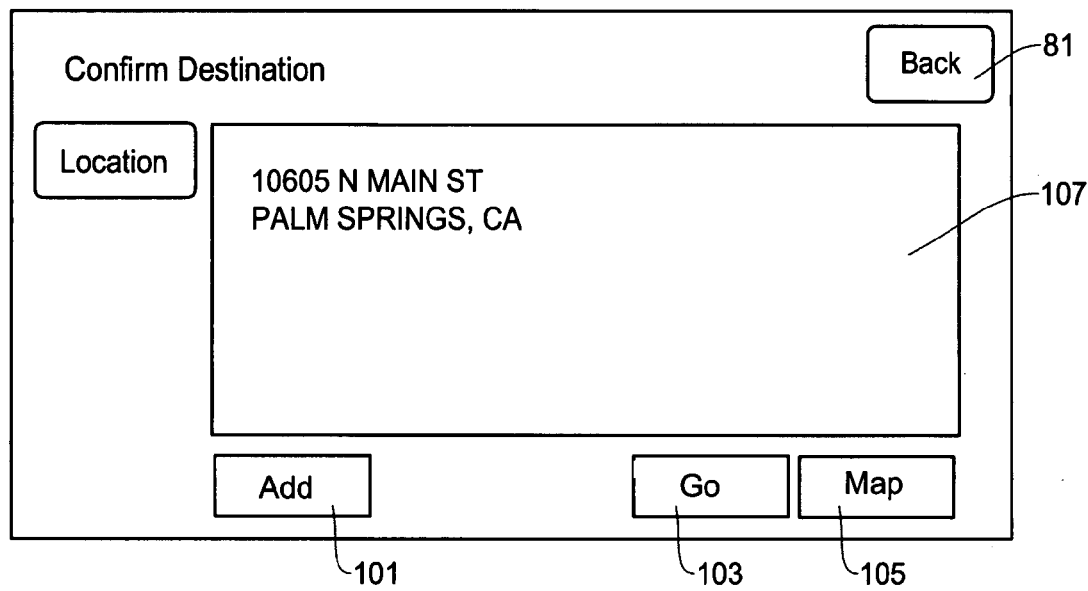

FIGS. 6J and 6K show a further example of final stage in the process of determining the address of the destination where the user has selected "PALM SPRINGS" from the city list 104 in FIG. 6E. This example shows a case of a combined situation of both FIGS. 6F and 6H. Accordingly, in this example, "10605 E MAIN AVE", "10605 MAIN ST", "10605 N MAIN ST" and "10605 N MAIN AVE" are listed as the candidate addresses that exactly match and best match the base name "MAIN" and street number "10605" in the city of "PALM SPRINGS". When the user selects one of the addresses in FIG. 6J, the navigation system displays a confirmation screen of FIG. 6K to confirm the destination.

As described in the foregoing steps, the navigation system allows the user to enter either a full name of the street or only a base name of the street in the same input field on the screen. Even when a prefix or a suffix is input along with a base name, the navigation system conducts the base name search so that incorrect input of the prefix or suffix by the user will not adversely affect the search process. In the last stage, the navigation system now incorporates the prefix or other non-base name element to detect the full name of the candidate address. With repeated use of the input method of the present invention, the user will learn that it is unnecessary to input a prefix or suffix of the street name.

Although the above example explained the case where the user enters the prefix and the base name, the present invention is applicable to the case where the user inputs a road type (avenue, street, drive, etc.) or a suffix (NW, SW, NE, etc.) after the base name. Thus, for example, when the user enters "E Beach AV" to the street name input field 73, the navigation system will change the appearance of the non-base name element in the manner as shown in FIG. 4A.

For instance, the base name "Beach" may be in normal black color while the prefix "E" and road type "AV" are shown in blue. Alternatively, similar to the example of FIGS. 6A-6K, the navigation system may remove such non-base element from the street name input field 73. The navigation system can search the matching street names based on the base name and retrieve the matching street names such as "W Beach Bld" and "Beach DR" that match the base name in the search process.

FIG. 7 is a flow chart showing a basic operational process for searching a POI in the present invention. In step 101, when the user selects the "Address" method for determining a destination as in the process of FIG. 1C, the navigation system displays a street name search screen. As shown in FIGS. 3A-6J, the street name search screen in the present invention has the street name input field 73. Regardless of whether a base name or a full name of a street, the user can input alphabetic and numeric characters in the street name input field 73.

In step 102, the navigation system determines whether the user has input any character (input data) in the street name input field 73. If no character is provided in the street name input field 73, the navigation system waits and keeps on showing the street name search screen in the step 101. If one or more characters are input in the street name input field 73, in step 103, the navigation system checks whether the input characters include a non-base name element such as a prefix of a street, thereby distinguishing the base name from non-base name elements.

If a non-base name element is found, in step 104, the navigation system selects a method of displaying the non-base name element on the screen. As described with reference to FIG. 4A-4K, the non-base name element may be displayed with a color different from the base name, the non-base name element may be displayed with lower brightness, i.e., dimmed, or the non-base name element may be displayed with a cross-out line, etc. Typically, such a display method is preset in the navigation system so that the navigation system displays the non-base element with the predetermined display method. Accordingly, the navigation system casually tells the user that the non-base element is treated differently from the base name.

In step 105, the navigation system conducts a base name search based on the base name distinguished from the input characters. The base name search will be repeated every time when additional information such as more characters of the base name or a house number, a city name etc., are provided in the street name search screen (step 107). Then, the navigation system retrieves the matching entries and displays a list of the matching entries in step 106. The steps 105-107 will be repeated to narrow down the candidate addresses of the destination.

When sufficient information are provided, typically when the house number and city name are specified by the user, in addition to the street name, the navigation system retrieves the matching entries from the full name database in step 108, As noted above, the matching entries include not only exact match entries but also best match entries as well. In step 109, upon confirming the destination, the navigation system determines a route to the destination and starts a route guidance operation.

Figure 8:
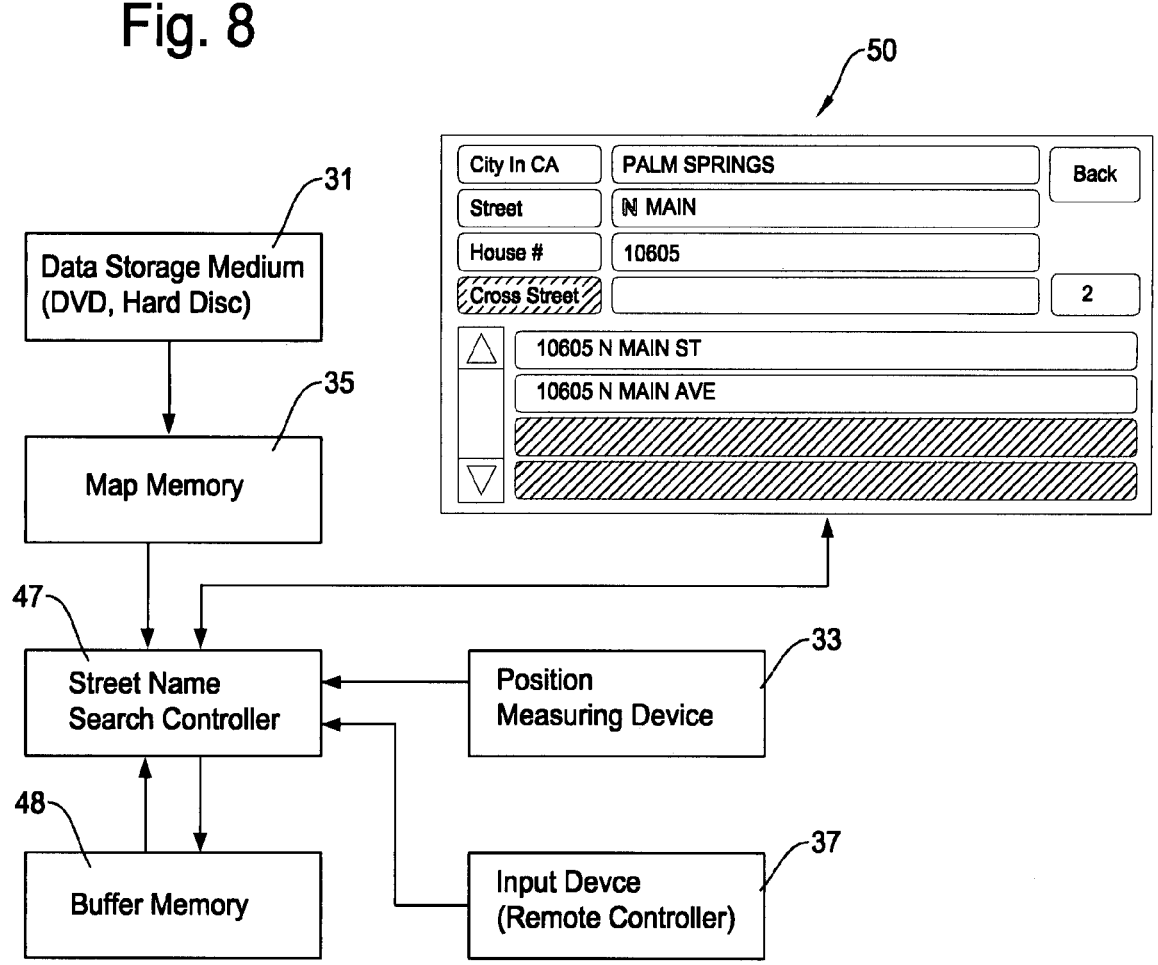
FIG. 8 is a block diagram showing the basic configuration of the apparatus of the present invention for entering and searching a street name based on either the base name input method or the full name input method.

FIG. 8 is a functional block diagram showing an example of basic structure of the apparatus of the present invention for searching a street name and determining an address of the destination. The structure of FIG. 8 is applicable to any electronic device having a navigation function which enables the electronic device to guide the user to a particular location as noted above. The apparatus of the present invention includes a monitor 50 for interfacing with the user, and a street name search controller 47 for controlling an overall operation of the apparatus of the present invention.

The block diagram of FIG. 8 further includes a map data storage 31 such as a DVD or a hard disc for storing map data including the street name data base (FIGS. 9A-9B), a map memory 35 for storing a required portion of map data retrieved from the map data storage 31, a position measuring (GPS) device 33 for detecting a current position of the user, an input device 37 such as a keypad or a remote controller for entering alpha-numeric characters, and a buffer memory 48 for temporarily storing various types of data for processing and operation of the apparatus.

In FIG. 8, the apparatus of the present invention is able to retrieve the map data from the map data storage 31 and map memory 35. If the electronic device implementing the present invention has a communication capability either through wire or wireless, such map data and street name (base name and full name) database can be retrieved from a remote data server. The street name search controller 47 controls an overall operation of searching and displaying candidate street names based on the user's input.

The user inputs an address of the destination through the input device 37 or the touch keys on the monitor 50 in the street name input field 73. As soon as any characters are input, the street name search controller 47 interprets the input character (input data) to determine whether the input character by the user includes a non-base name element such as a prefix. The street name search controller 47 either changes the color, brightness or other way of the non-base element on the screen to differentiate the base name and the non-base name elements.

The street name search controller 47 conducts the base name search and retrieves the matching entries from the base name database. When the house number and city are specified by the user, the street name search controller 47 retrieves the matching entries from the full name database and displays them on the monitor 50. As noted above, entries displayed on the monitor 50 include not only exact match entries but also best match entries as well. During the process of determining the address, the buffer memory 48 may be preferably used to temporarily store the retrieved data to promote such a process.

FIGS. 9A and 9B are schematic diagrams showing examples of street name database. FIG. 9A shows a part of base name database 120 which stores base names of streets in a predetermined order. As noted above, during most of the process for determining the address of the destination, base name search is conducted with use of the base name database 120. FIG. 9B shows a part of full name database 140 which stores full names of streets in a predetermined order. As noted above, at the final stage of the process for determining the address of the destination, full name search is conducted with use of the full name database 140.

Figure 10:
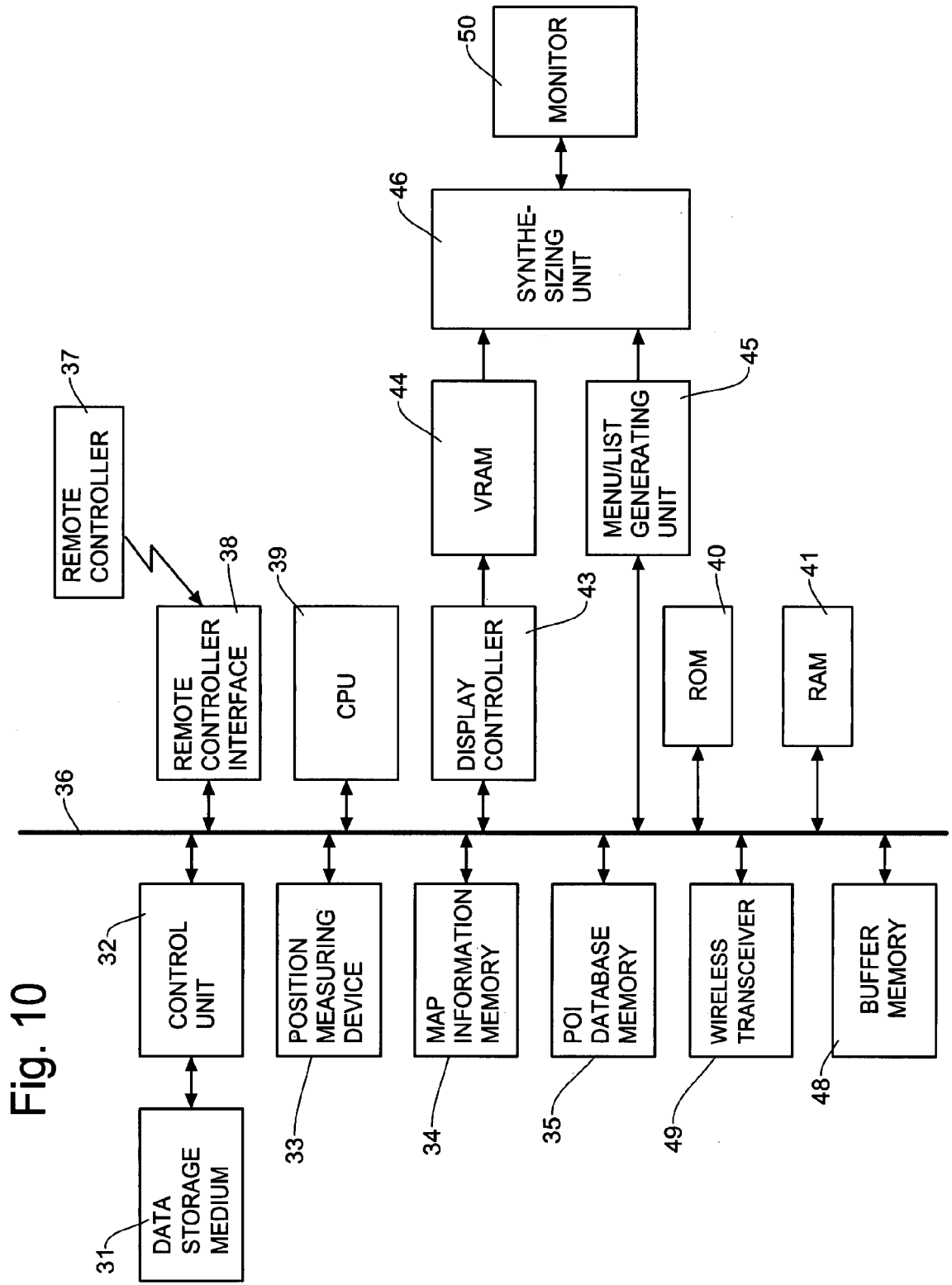
FIG. 10 is a block diagram showing an example of configuration of a vehicle navigation system implementing the street name search method and apparatus of the present invention.

FIG. 10 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means (hereafter "data disc") for storing the map data. The brand icons and the look-up table are also stored in the data storage medium 31. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver, etc.

The block diagram of FIG. 10 further includes a map information memory 34 for storing the map information which is read from the data storage device 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller. The data storage device 31 has a street name database that allows the search based on a base name and a full name of the street name.

In FIG. 10, the navigation system further includes a bus 36 for interfacing the above units in the system, a processor (CPU) 39 for controlling an overall operation of the navigation system including the control operations performed by the street name search controller 47 in FIG. 8, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, a wireless transceiver 49 for wireless communication to retrieve data from a remote server, a buffer memory 48 for temporarily storing data for ease of data processing, and a monitor (display) 50.

As has been described above, according to the present invention for inputting a street name, the navigation system allows a user to quickly find a desired street name even when the user inputs an incorrect prefix or suffix of the street name. The navigation system accepts a street name based on either a base name input method or a full name input method in the same input field while performing a street name search mostly based on a base name of the street name. The method and apparatus hints an inexperienced user the distinction between the base name and other components of the street name so that the user knows that non-base name element is unnecessary for finding the correct address of the destination.

Since the navigation system extends the search for a street name by looking up all names that match the base name regardless of the other components of the street name, such as a prefix, thereby increasing the possibility of finding matching entries form the street name database. Through the experiences of using the apparatus of the present invention, the user will learn that it is easy and quick to input only a base name without entering a prefix or other components. In the last stage of selecting the street name, the navigation system retrieves one or more full names of the relevant entries and displays a list of the full names so that the user can select the intended address of the destination.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for entering a street name to determine an address of a destination for a navigation system, comprising the following steps of:
   displaying a screen for searching a street name, the screen including a street name input field for accepting a user's input of characters either by a full name or a base name of a street;
   distinguishing a non-base name element from a base name of a street name in the input character and displaying the non-base name element by a selected method on the screen;
   comparing the base name detected from the characters input by the user with entries in a base name database that stores base names of streets;
   retrieving base names from the base name database that match the base name detected from the characters input by the user and displaying a list of the retrieved base names;
   repeating the above steps of comparing and retrieving the base names every time when additional information is supplied by the user; and
   retrieving full names of streets from a full name database that stores full names of streets to determine a correct address of the destination.

2. A method for entering a street name as defined in claim 1, wherein said step of displaying the non-base name element in the input characters by a selected method includes a step of changing a color or brightness of the non-base name element from that of the base name.

3. A method for entering a street name as defined in claim 1, wherein said step of displaying the non-base name element in the input characters by a selected method includes a step of changing a size or a shape of the non-base name element from that of the base name or adding a crossing-out bar on the non-base name element.

4. A method for entering a street name as defined in claim 1, wherein said step of displaying the non-base name element in the input characters by a selected method includes a step of removing the non-base name element from the screen of the navigation system.

5. A method for entering a street name as defined in claim 1, wherein said step of displaying the non-base name element in the input characters by a selected method includes a step of displaying the non-base name element without change.

6. A method for entering a street name as defined in claim 1, wherein said step of retrieving the base names from the base name database includes a step of retrieving a base name that exactly matches the base name detected from the characters input by the user as well as a base name that best matches the base name detected from the characters input by the user.

7. A method for entering a street name as defined in claim 1, wherein said step of retrieving the full names from the full name database includes a step of retrieving a full name that exactly matches the characters input by the user as well as a full name that best matches the characters input by the user.

8. A method for entering a street name as defined in claim 1, wherein said additional information includes a house number on a selected street name.

9. A method for entering a street name as defined in claim 1, wherein said additional information includes a city name where a selected street name is located.

10. A method for entering a street name as defined in claim 1, wherein said non-base element of a street name includes a prefix, road type, and a suffix.

11. An apparatus for entering a street name to determine an address of a destination for a navigation system, comprising:
   means for displaying a screen for searching a street name, the screen including a street name input field for accepting a user's input of characters either by a full name or a base name of a street;
   means for distinguishing a non-base name element from a base name of a street name in the input character and for displaying the non-base name element by a selected method on the screen;
   means for comparing the base name detected from the characters input by the user with entries in a base name database that stores base names of streets;
   means for retrieving base names from the base name database that match the base name detected from the characters input by the user and displaying a list of the retrieved base names;
   means for repeating the above steps of comparing and retrieving the base names every time when additional information is supplied by the user; and
   means for retrieving full names of streets from a full name database that stores full names of streets to determine a correct address of the destination.

12. An apparatus for entering a street name as defined in claim 11, wherein said means for displaying the non-base name element in the input characters by a selected method includes means for changing a color or brightness of the non-base name element from that of the base name.

13. An apparatus for entering a street name as defined in claim 11, wherein said means for displaying the non-base name element in the input characters by a selected method includes means for changing a size or a shape of the non-base name element from that of the base name or adding a crossing-out bar on the non-base name element.

14. An apparatus for entering a street name as defined in claim 11, wherein said means for displaying the non-base name element in the input characters by a selected method includes means for removing the non-base name element from the screen of the navigation system.

15. An apparatus for entering a street name as defined in claim 11, wherein said means for displaying the non-base name element in the input characters by a selected method includes means for displaying the non-base name element without change.

16. An apparatus for entering a street name as defined in claim 11, wherein said means for retrieving the base names from the base name database includes means for retrieving a base name that exactly matches the base name detected from the characters input by the user as well as a base name that best matches the base name detected from the characters input by the user.

17. An apparatus for entering a street name as defined in claim 11, wherein said means for retrieving the full names from the full name database includes means for retrieving a full name that exactly matches the characters input by the user as well as a full name that best matches the characters input by the user.

18. An apparatus for entering a street name as defined in claim 11, wherein said additional information includes a house number on a selected street name.

19. An apparatus for entering a street name as defined in claim 11, wherein said additional information includes a city name where a selected street name is located.

20. An apparatus for entering a street name as defined in claim 11, wherein said non-base element of a street name includes a prefix, road type, and a suffix.

* * * * *